United States Patent
Zeng et al.

(10) Patent No.: US 10,845,972 B2
(45) Date of Patent: Nov. 24, 2020

(54) DATA DISPLAY METHOD AND APPARATUS, STORAGE MEDIUM, AND TERMINAL

(71) Applicant: TENCENT TECHNOLOGY (SHENZHEN) COMPANY LIMITED, Shenzhen (CN)

(72) Inventors: Liang Zeng, Shenzhen (CN); Xuechao Li, Shenzhen (CN); Jinghui Shi, Shenzhen (CN); Lei Chen, Shenzhen (CN); Dong Wang, Shenzhen (CN); Liang Kang, Shenzhen (CN); Jing Qian, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/363,796

(22) Filed: Mar. 25, 2019

(65) Prior Publication Data

US 2019/0220176 A1    Jul. 18, 2019

Related U.S. Application Data

(63) Continuation of application No. PCT/CN2018/072865, filed on Jan. 16, 2018.

(30) Foreign Application Priority Data

Feb. 27, 2017   (CN) .......................... 2017 1 0110737

(51) Int. Cl.
*G06F 3/0484* (2013.01)
*G09B 19/06* (2006.01)
(Continued)

(52) U.S. Cl.
CPC .......... *G06F 3/04845* (2013.01); *G06F 3/011* (2013.01); *G06F 3/017* (2013.01);
(Continued)

(58) Field of Classification Search
CPC ...... G06F 3/04845; G06F 3/011; G06F 3/017; G06F 3/04883; G06F 2203/04803; G09B 19/06
See application file for complete search history.

(56) References Cited

U.S. PATENT DOCUMENTS

| 8,180,405 B2 * | 5/2012 | Kim ...................... H04M 19/04 |
| | | 345/156 |
| 8,786,698 B2 * | 7/2014 | Chen ...................... G06F 3/011 |
| | | 348/135 |

(Continued)

FOREIGN PATENT DOCUMENTS

| CN | 101131691 A | 2/2008 |
| CN | 101707009 A | 5/2010 |

(Continued)

OTHER PUBLICATIONS

Patel, Shwetak N., and Gregory D. Abowd. "Blui: low-cost localized blowable user interfaces." Proceedings of the 20th annual ACM symposium on User interface software and technology. 2007. (Year: 2007).*

(Continued)

*Primary Examiner* — Andrew T Chiusano
(74) *Attorney, Agent, or Firm* — Anova Law Group, PLLC

(57) ABSTRACT

A data display method and apparatus, a storage medium, and a terminal are provided. The method includes obtaining a data display request; and obtaining an entry in response to the data display request. The entry includes first target data and second target data, and the first target data and the second target data have a predetermined association relationship. The method also includes: displaying the first target data in a display interface; designating a space on the display interface for the second target data; and generating a mask layer. The mask layer has a size matching the (Continued)

designated space and covers the second target data. The method also includes determining a target region based on a user operation performed on the designated space; and displaying the second target data in the target region.

19 Claims, 12 Drawing Sheets

(51) Int. Cl.
*G06F 3/01* (2006.01)
*G06F 3/0488* (2013.01)

(52) U.S. Cl.
CPC ......... *G06F 3/04883* (2013.01); *G09B 19/06* (2013.01); *G06F 2203/04803* (2013.01)

(56) References Cited

U.S. PATENT DOCUMENTS

| | | | |
|---|---|---|---|
| 2008/0052061 A1 | 2/2008 | Kim et al. | |
| 2009/0077479 A1* | 3/2009 | Tucci | G09B 7/04 715/764 |
| 2009/0077497 A1 | 3/2009 | Cho et al. | |
| 2012/0066575 A1 | 3/2012 | Abe | |
| 2013/0047115 A1* | 2/2013 | Migos | G06F 3/0484 715/776 |
| 2014/0100844 A1* | 4/2014 | Stieglitz | G09B 19/06 704/3 |
| 2014/0340337 A1 | 11/2014 | Han | |
| 2015/0186346 A1* | 7/2015 | Mesguich Havilio | G06F 3/0488 715/256 |
| 2015/0309713 A1* | 10/2015 | Dong | G06F 3/04842 715/766 |
| 2016/0026249 A1* | 1/2016 | Glass | G06F 3/016 715/702 |
| 2016/0092440 A1* | 3/2016 | Bhuvaneswaran | G06F 9/454 704/3 |
| 2016/0117854 A1 | 4/2016 | Ohtsuka et al. | |
| 2016/0188547 A1* | 6/2016 | Cruzada | H04L 67/02 715/749 |
| 2016/0343272 A1* | 11/2016 | Roche | G09B 5/04 |
| 2017/0075561 A1* | 3/2017 | Ghazanfari | G06F 21/6245 |
| 2018/0052827 A1* | 2/2018 | Mathada | G06F 9/454 |
| 2018/0329612 A1* | 11/2018 | Tao | G06F 3/04883 |

FOREIGN PATENT DOCUMENTS

| | | |
|---|---|---|
| CN | 102214165 A | 10/2011 |
| CN | 102402868 A | 4/2012 |
| CN | 102411853 A | 4/2012 |
| CN | 102707805 A | 10/2012 |
| CN | 102945133 A | 2/2013 |
| CN | 105164739 A | 12/2015 |
| CN | 105302783 A | 2/2016 |
| CN | 105373314 A | 3/2016 |

OTHER PUBLICATIONS

The World Intellectual Property Organization (WIPO) International Search Report for PCT/CN2018/072865 Apr. 20, 2018 6 Pages (including translation).
The State Intellectual Property Office of the People's Republic of China (SIPO), Office Action 1 for 201710110737.2, dated Sep. 3, 2020, 16 Pages (including translation).

* cited by examiner

DATA DISPLAY METHOD AND APPARATUS, STORAGE MEDIUM, AND TERMINAL

RELATED APPLICATIONS

This application is a continuation application of PCT Patent Application No. PCT/CN2018/072865, filed on Jan. 16, 2018, which claims priority to Chinese Patent Application No. 2017101107372, filed with the Chinese Patent Office on Feb. 27, 2017 and entitled "DATA DISPLAY METHOD AND APPARATUS", both of which are incorporated herein by reference in their entirety.

FIELD OF TECHNOLOGY

This application relates to the field of computers, and specifically, to a data display method and apparatus, a storage medium, and a terminal.

BACKGROUND OF THE DISCLOSURE

Nowadays, to facilitate recitation and memorization by users, many translation tools provide the users with a data display manner in which repeated switching and viewing can be conveniently performed, for memorization. Commonly used manners include the following:

(1) A switching button is provided on a user interface, and a tap operation is performed on the switching button, to implement switching control on direct display or hidden display of predetermined information, to memorize the predetermined information through repeated switching and display. As shown in FIG. 1, after a button displayed in the lower right corner of a user interface is tapped, switching control on "direct display" or "hidden display" of translation information obtained by a translation tool is implemented.

(2) A jump button is provided on a user interface, and a tap operation is performed on the jump button, to switch to a page displayed with predetermined information, to memorize the predetermined information through repeated switching and display. As shown in FIG. 2, after a button displayed in the lower right corner of a user interface is tapped, a next page displayed with translation information obtained by a translation tool is jumped to.

However, when the foregoing tap interaction operation is performed for display, the translation information obtained through conversion can be displayed in the user interface only all at once, and displayed content cannot be flexibly adjusted.

For the foregoing problem, an effective solution is not provided yet at present.

SUMMARY

Embodiments of this application provide a data display method and apparatus, a storage medium, and a terminal, to resolve at least a technical problem of relatively low display flexibility caused in a related data display manner.

According to an aspect of the embodiments of this application, a data display method applied to a computing device is provided. The method includes obtaining a data display request; and obtaining an entry in response to the data display request. The entry includes first target data and second target data, and the first target data and the second target data have a predetermined association relationship. The method also includes: displaying the first target data in a display interface; designating a space on the display interface for the second target data; and generating a mask layer. The mask layer has a size matching the designated space and covers the second target data. The method also includes determining a target region based on a user operation performed on the designated space; and displaying the second target data in the target region.

According to another aspect of the embodiments of this application, a data display apparatus is further provided. The apparatus includes a memory; and a processor coupled to the memory. The processor is configured to obtain a data display request; and obtain an entry in response to the data display request. The entry includes first target data and second target data, and the first target data and the second target data have a predetermined association relationship. The processor is also configured to display the first target data in a display interface; designate a space on the display interface for the second target data; and generate a mask layer. The mask layer has a size matching the designated space and covers the second target data. The processor is also configured to determine a target region based on a user operation performed on the designated space; and display the second target data in the target region.

According to still another aspect of the embodiments of this application, a storage medium is further provided. The storage medium stores a computer program, the computer program being executable by at least one processor to perform: obtaining a data display request; and obtaining an entry in response to the data display request. The entry includes first target data and second target data, and the first target data and the second target data have a predetermined association relationship. The computer program also cause the at least one processor to perform: displaying the first target data in a display interface; designating a space on the display interface for the second target data; and generating a mask layer. The mask layer has a size matching the designated space and covers the second target data. The computer program also cause the at least one processor to perform: determining a target region based on a user operation performed on the designated space; and displaying the second target data in the target region.

According to still another aspect of the embodiments of the present disclosure, a data display terminal is further provided. The terminal includes a memory, a processor, and a computer program stored in the memory and capable of being run on the processor, the processor performing the foregoing method by using the computer program.

In the embodiments of this application, a requested entry is displayed in a display interface in response to a data display request, the entry including first target data and second target data, there being a predetermined association relationship between the first target data and the second target data, and the second target data being hidden in the display interface; and then a user operation is performed on a layer matching the second target data, and a target region is determined based on the user operation, to display the second target data in the target region. To be specific, after the requested entry is displayed, where the second target data in the entry is hidden in the display interface, the user operation is performed on the layer matching the second target data, and the target region used to display the second target data is determined based on the user operation, to flexibly control the second target data to be displayed, and further help repeatedly memorize the second target data, without being limited to displaying the second target data all at once, thereby overcoming a problem of relatively low data display flexibility in a related technology.

BRIEF DESCRIPTION OF THE DRAWINGS

The accompanying drawings described herein are used to provide a further understanding of this application, and form a part of this application. Exemplary embodiments of this application and descriptions thereof are used to explain this application, but do not constitute an improper limitation on this application. In the accompanying drawings.

DESCRIPTION OF EMBODIMENTS

To make a person skilled in the art understand the solutions in this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

It should be noted that, in the specification, the claims, and the accompanying drawings of this application, the terms "first", "second", and the like are intended to distinguish between similar objects but do not necessarily indicate a specific order or sequence. It should be understood that the data used in this way are interchangeable in an appropriate case, so that the embodiments of this application described herein can be implemented in an order other than the order illustrated or described herein. Moreover, the terms "include", "contain" and any other variants thereof are intended to cover a non-exclusive inclusion, for example, a process, method, system, product, or device that includes a list of steps or units is not necessarily limited to those steps or units, but may include other steps or units not expressly listed or inherent to such a process, method, product, or device.

Figure 1:
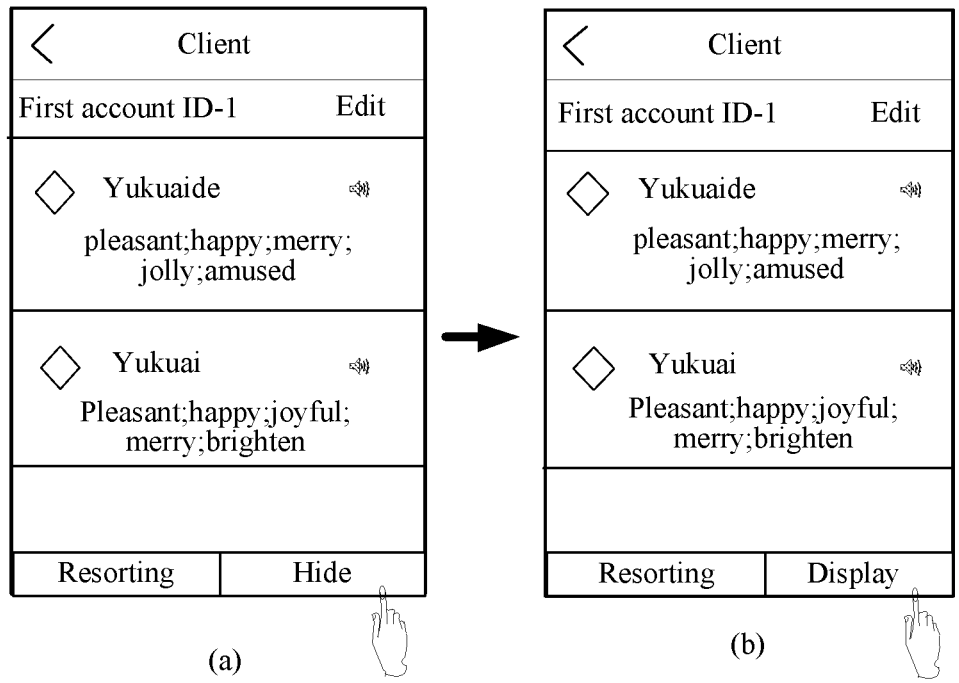
FIG. 1 is a schematic diagram of a data display method according to a related technology.
Figure 2:
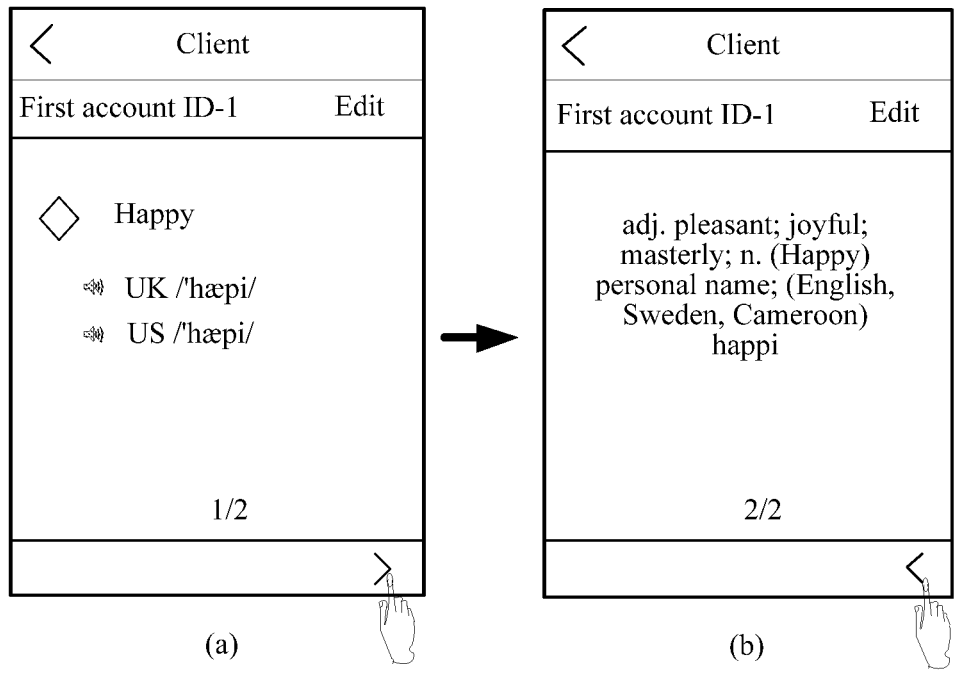
FIG. 2 is a schematic diagram of another data display method according to a related technology.
Figure 3:
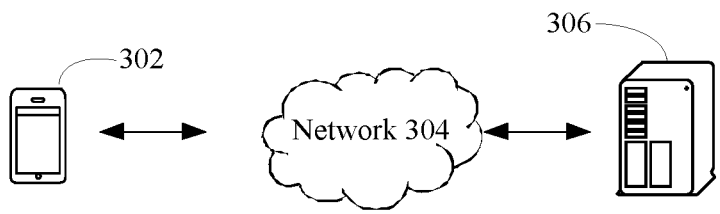
FIG. 3 is a schematic diagram of an application environment of an optional data display method according to an embodiment of this application.

According to an aspect of the embodiments of this application, an embodiment of a data display method is provided. In an optional implementation, the data display method is applicable to, but not limited to, an application scenario shown in FIG. 3. The application scenario is a data exchange system including a mobile terminal and a network server. The terminal 302 obtains a data display request used to request data display; obtains an entry from a server 306 by using a network 304 in response to the data display request; displays the entry in a display interface of a client, the requested entry including first target data and second target data, there being a predetermined association relationship between the first target data and the second target data, and the second target data being covered/hidden by an opaque/mosaic mask in the display interface; determines a target region based on a user operation performed on the mask; and removes the opaque/mosaic in the target region of the mask to display at least a part of the second target data.

In addition, in one embodiment, the data display method is further applicable to, but not limited to, the following scenario (not shown): The entry is cached in the client, to be specific, after the data display request is obtained, the entry to be displayed may be directly obtained from a cache of the client, without requesting from the server by using the network, to reduce a waiting time and simplify an interaction operation.

In one embodiment, an entry is obtained in response to an obtained data display request, the entry including first target data and second target data, there being a predetermined association relationship between the first target data and the second target data; the first target data is displayed in a display interface of a client; a space is designated on the display interface for the second target data; and a mask layer is generated, the mask layer having a size matching the designated space and covering the second target data; and then a user operation is performed on the designated space (e.g., directed to the mask layer), and a target region is determined based on the user operation, to display the second target data in the target region. To be specific, after the requested entry is displayed, where the second target data in the entry is hidden in the display interface, the user operation is performed on the mask layer matching the second target data (i.e., the designated space), and the target region used to display the second target data is determined based on the user operation, to flexibly control the second target data to be displayed, and further help repeatedly memorize the second target data, without being limited to displaying the second target data all at once, thereby overcoming a problem of relatively low data display flexibility in a related technology.

Optionally, in one embodiment, the terminal may include, but is not limited to, at least one of the following: a mobile phone, a tablet computer, a notebook computer, a desktop PC, a smart TV, or another hardware device installed with a data conversion client. The network may include, but is not limited to, at least one of the following: a wide area network, a metropolitan area network, or a local area network. The foregoing description is merely an example, and this is not limited in one embodiment.

Figure 4:
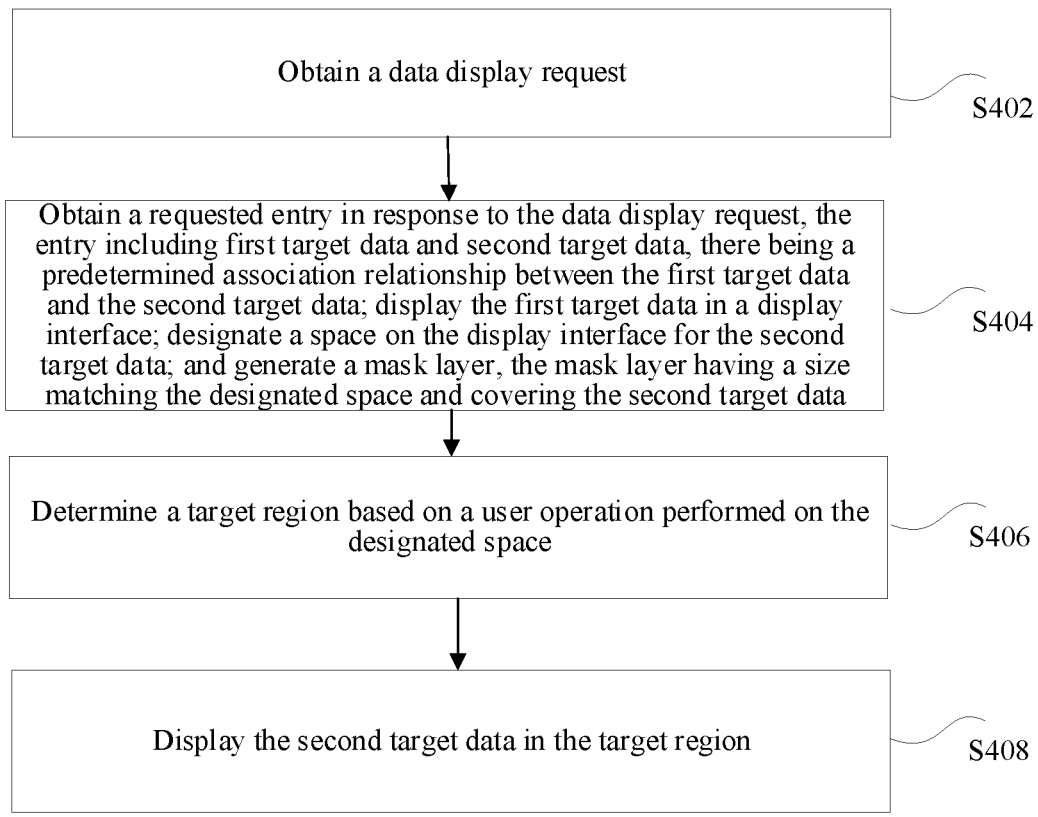
FIG. 4 is a flowchart of an optional data display method according to an embodiment of this application.

According to an embodiment of this application, a data display method is provided. As shown in FIG. 4, the method includes the following steps:

S402: Obtain a data display request.

S404: Obtain a requested entry in response to the data display request, the entry including first target data and second target data, there being a predetermined association relationship between the first target data and the second target data; display the first target data in a display interface; designate a space on the display interface for the second target data; and generate a mask layer, the mask layer having a size matching the designated space and covering the second target data. The mask layer may also be referred to as the layer in some embodiments of the present disclosure. In one embodiment, an entry can be obtained in response to the data display request. The entry includes first target data and second target data, and the first target data and the second target data have a predetermined association relationship. The first target data is displayed in the display interface. A space on the display interface is designated for the second target data. The second target data is not necessarily displayed. In one example, the second target data may be rendered at the designated space but covered by a top layer. In another example, the designated space for the second target data may have a size matching the second target data, and part or all of the second target data is not rendered and/or displayed until certain user operation is performed and certain condition is satisfied. In some embodiments, displaying an entry in the display interface can be understood as displaying the first target data in the display interface and a space on the display interface for the second target data (e.g., the second target data being covered, hidden, or not displayed/rendered).

S406: Determine a target region based on a user operation performed on the designated area.

S408: Display the second target data in the target region. In one embodiment, the target region may be equal to or smaller than the designated space for the second target data. When the target region is smaller, only part of the second target data matching the location and size the target region is displayed.

Optionally, in one embodiment, the data display method is applicable to, but not limited to, an application client for data conversion, for example, an application client for language translation. Herein, it should be noted that, the data display method is also applicable to another application client for data conversion. An entry displayed in these application clients includes first target data and second target data that have a predetermined association relationship, for example, classical Chinese poetry and modern literature, words, idioms, proverbs, and the like and corresponding analysis, drawing reading for children and a name and a funny game, and other corresponding data having an association relationship. The association relationship between the first target data and the second target data may be set based on practical experience or a user requirement, for example, may be a translation, an explanation, or a description. This is not limited herein in one embodiment.

In addition, in one embodiment, the first target data, the second target data, and the association relationship between the first target data and the second target data in the entry may be flexibly configured in a client, without being limited to obtaining an entry with an association relationship fixed in advance. It should be noted that, the first target data in the entry may be a word, a word combination, a sentence, or an image. This is not limited in one embodiment. In one embodiment, the entry is not limited to including only two pieces of data, namely, the first target data and the second target data, but may include a plurality of pieces of target data such as the first target data, the second target data, and third target data. There is an association relationship between the plurality of pieces of target data included in the entry. At least one piece of target data is hidden.

In a specific application scenario, the foregoing application client for language translation is used as an example. After the application client obtains a data display request, the client obtains a requested entry to be displayed in a display interface in response to the data display request. Each entry includes first target data (namely, original data) and second target data (namely, translation data), there is a predetermined association relationship between the first target data (namely, the original data) and the second target data (namely, the translation data), and the second target data (namely, the translation data) is hidden or covered by a mask layer in the display interface of the client. The display interface has a designated space for the second target data. The mask layer has a size matching the designated space. The mask layer matches the second target data (namely, the translation data), to block the second target data (namely, the translation data) and/or to hide the second target data. In some embodiments, the mask layer matching the second target data may be a layer that covers the second target data. Then the client determines a target region based on a user operation performed on the mask layer, to display the second target data (namely, the translation data) in the target region. Specifically, a track generated by performing the user operation on the mask layer may be obtained, a region covered by the track may be used as the target region, and the mask layer may be removed from the target region, to display the second target data in the target region, so that the second target data to be displayed in the display interface of the client is flexibly controlled based on the track corresponding to the user operation.

It should be noted that, in one embodiment, a requested entry is displayed in a display interface in response to a data display request, the entry including first target data and second target data, there being a predetermined association relationship between the first target data and the second target data, and the second target data being hidden in the display interface; and then a user operation is performed on a mask layer matching the second target data, and a target region is determined based on the user operation, to display the second target data in the target region. To be specific, after the requested entry is displayed, where the second target data in the entry is hidden in the display interface, the user operation is performed on the mask layer matching the second target data, and the target region used to display the second target data is determined based on the user operation, to flexibly control the second target data to be displayed, and further help repeatedly memorize the second target data, without being limited to displaying the second target data all at once, thereby overcoming a problem of relatively low data display flexibility in a related technology.

Optionally, in one embodiment, the mask layer matching the second target data may be, but is not limited to, an independent layer covering the second target data. In other words, the first target data and the second target data are on the same layer, and the second target data is covered with another layer. After predetermined image processing is performed on the mask layer (the independent layer covering the second target data), the mask layer is used to cover the second target data, so that the second target data is hidden in the display interface. To be specific, the second target data covered with the mask layer is revealed in response to performing an operation of removing the mask layer.

It should be noted that, the predetermined image processing may include, but is not limited to, the following processing performed on the mask layer: Gaussian blur processing, Mosaic processing, or configuring the mask layer as an image displayed with predetermined content. The predetermined content may include, but is not limited to, a commercial advertisement, a public service advertisement, prompt information used to prompt for the second target data, and the like. This is not limited herein.

To be specific, to achieve a blocking effect, the mask layer covering the second target data may be a first layer obtained after the Gaussian blur processing, or may be a second layer obtained after the Mosaic processing, or may be a layer including the image displayed with the predetermined content. The foregoing description is merely an example, and another form of another layer for achieving the blocking effect is not limited in one embodiment.

In addition, in one embodiment, the mask layer matching the second target data may also be, but is not limited to, an original layer carrying the second target data (a layer on which the second target data is located). In other words, the first target data and the second target data are on two separate layers. After predetermined image processing is performed on the mask layer (the layer by which the second target data is located/covered), the second target data is hidden in the display interface. To be specific, an inverse operation is performed on the predetermined image processing process, to display the second target data on the mask layer. It should be noted that, the predetermined image processing may include, but is not limited to, stamping garbled characters, a pattern, and the like on the mask layer on which the second target data is located, to fuzzily display the second target data in the display interface through hybrid display, thereby implementing hidden display.

Optionally, in one embodiment, the obtaining a requested entry to be displayed in a display interface in response to the data display request may include, but is not limited to, obtaining the entry satisfying a predetermined condition in the display interface, where the predetermined condition is carried in the data display request.

It should be noted that, in one embodiment, the entry satisfying the predetermined condition may include, but is not limited to, at least one of the following: the entry stored at a predetermined storage time, the entry marked by using a predetermined identifier, or the entry whose operation frequency is greater than a predetermined threshold. The foregoing description is merely an example, and in one embodiment, another predetermined condition may also be configured. This is not limited herein.

Optionally, in one embodiment, the determining a target region based on a user operation performed on the mask layer specifically includes: first obtaining an operation mode of the user operation performed on the mask layer, where the operation mode may be a touchscreen sliding operation, a blowing sensing operation, a shaking or vibration sensing operation, a sound control operation, or the like; and after obtaining the current operation mode, determining, based on the operation mode, the target region matching the user operation.

It should be noted that, the foregoing operation manner is merely an example of the operation mode in one embodiment. In one embodiment, the operation mode may be a separate operation manner such as only the touchscreen sliding operation, or may be a combination of a plurality of operation manners such as a combination of the touchscreen sliding operation and the blowing operation. A specific operation manner and a specific combination manner are not limited herein.

Optionally, in one embodiment, the determining, based on the operation mode, the target region matching the user operation may include the following:

(1) Touchscreen Sliding Operation

It should be noted that, in a process of performing the touchscreen sliding operation, a track width of the touchscreen sliding operation on a display screen may be preset based on a user requirement, or may be set based on pressure applied by the touchscreen sliding operation to a display screen. The foregoing description is merely an example, and another form of setting a track width of another touchscreen sliding operation is not limited in one embodiment.

In addition, in a process in which a user performs the touchscreen sliding operation, the touchscreen sliding operation may be, but is not limited to, a tap operation or an operation of continuous sliding. When the touchscreen sliding operation is continuous sliding, the target region may be obtained based on a moving track formed during the sliding. When the touchscreen sliding operation is a tap operation, the target region may also be obtained based on an operation position of the tap operation. For example, a track determining manner corresponding to the tap operation may be preset. Specifically, when the touchscreen sliding operation is tapping, a circular moving track, namely, a circular region or an elliptical region with a tap position as a circle center may be displayed, or a moving track in one row may be displayed. A radius, a length, a width, a shape, and the like of a specific moving track may be set based on practical experience. This is not limited herein.

(2) Air Pressure Sensing Operation

It should be noted that, in a process of performing the air pressure sensing operation, the corresponding target region is determined based on a position of a first sensing region and/or a moving track. An example is described below. (1) If a first sensing region that is generated after a blowing action is performed on the mask layer is obtained, the target region is determined based on a position of the first sensing region. To be specific, during movement of the first sensing region, the position of the first sensing region is always determined as the target region. (2) If a first sensing region that is generated after a blowing action is performed on the mask layer is obtained, the target region is determined based on a moving track of the first sensing region. To be specific, during movement of the first sensing region, the target region is determined based on the moving track of the first sensing region. (3) If at least two first sensing regions that are generated after a blowing action is directed to the mask layer are obtained, the target region is determined based on positions of the at least two first sensing regions. To be specific, a plurality of first sensing regions is successively generated, and positions of the plurality of first sensing regions are determined as the target region. The foregoing description is merely an example, and this is not limited in one embodiment.

(3) Vibration Sensing Operation

It should be noted that, in a process of performing the vibration sensing operation, a reference point on the mask layer is first determined, and a first sensing region matching the vibration sensing operation is directed to the mask layer based on the reference point. A higher vibration frequency and/or higher vibration strength of the vibration sensing operation indicates a larger area of the target region generated based on the reference point.

Optionally, in one embodiment, before the displaying a requested entry in a display interface in response to the data display request, the method may further include, but is not limited to, one of the following:

(1) displaying prompt information on the display interface, where the prompt information is used to prompt whether to perform the user operation; and displaying the entry in the display interface if it is determined to perform the user operation; or (2) obtaining an operation instruction that is generated by performing a tap operation on an operation button displayed in the display interface; and displaying the entry in the display interface in response to the operation instruction after receiving the operation instruction, where the operation button is used to instruct to perform the user operation.

It should be noted that, in one embodiment, the entry may be, but is not limited to, a target entry collected to the client in advance, or may be a locally stored entry. Before a collection interface is entered to display the entry, the foregoing steps may be performed but this is not limited thereto, to determine whether to display an entry that is in the collection interface and in which second target data is covered with a mask layer.

Optionally, in one embodiment, before the obtaining a data display request, the method may further include, but is not limited to: updating sorting identifiers of a plurality of entries, where the sorting identifiers are determined based on at least one of storage time of the entries or operation frequency at which user operations have been performed on the entries; and then, updating an arrangement order of the plurality of entries based on the sorting identifiers. To be specific, an entry list is updated in real time, to ensure that the displayed entry list more meets a real-time requirement of a user, thereby improving display accuracy.

Optionally, in one embodiment, before the obtaining a data display request, the method may further include, but is not limited to: obtaining an entry collection request, where the entry collection request carries a hash value matching a target entry to be collected, and the hash value is determined based on the first target data in the target entry, a data type of the first target data, and a data type of the second target data; during the obtaining an entry collection request, first searching for the target entry based on the hash value; and collecting the target entry when the target entry is not found. To be specific, a hash value used to uniquely identify an entry in the collection interface is configured for the entry, to ensure uniqueness of the entry in the entry list based on the hash value.

According to one embodiment provided in this application, a requested entry is displayed in a display interface in response to a data display request, the entry including first target data and second target data, there being a predetermined association relationship between the first target data and the second target data, and the second target data being hidden in the display interface; and then a user operation is performed on a mask layer matching the second target data, and a target region is determined based on the user operation, to display the second target data in the target region. To be specific, after the requested entry is displayed, where the second target data in the entry is hidden in the display interface, the user operation is performed on the mask layer matching the second target data, and the target region used to display the second target data is determined based on the user operation, to flexibly control the second target data to be displayed, and further help repeatedly memorize the second target data, without being limited to displaying the second target data all at once, thereby overcoming a problem of relatively low data display flexibility in a related technology.

In an optional solution, the method includes the following steps:

S1: Generate the mask layer matching the second target data.

S2: Cover the second target data in the entry with the mask layer, so that the second target data is hidden when the entry is displayed in the display interface. In some embodiments, the mask layer may be generated before obtaining the requested entry.

Optionally, in one embodiment, the mask layer matching the second target data may be generated based on preconfigured display layout information, but this is not limited thereto. A display height of the generated mask layer is a display height of the second target data, to save display space and improve space utilization, thereby improving a display effect.

Optionally, in one embodiment, the generating the mask layer matching the second target data includes at least one of the following:

(1) Gaussian blur processing is performed on the mask layer based on a predetermined parameter.

Figure 5:
FIG. 5 is a schematic diagram of an optional data display method according to an embodiment of this application.

Specifically, descriptions are provided with reference to FIG. 5. An example in which the method is applied to an application client for language translation and the second target data is covered with an independent layer is used. Each entry includes first target data (namely, original data) and second target data (namely, translation data), and each piece of second target data (namely, the translation data) is hidden by a covering layer. As shown in FIG. 5, the generated mask layer may be a layer obtained after the Gaussian blur processing is performed based on the predetermined parameter, and the second target data of the corresponding entry is covered with the mask layer. After the user operation performed on the mask layer is obtained, the target region may be determined based on the user operation, for example, a touchscreen sliding operation is performed, to remove the mask layer from the target region, so as to display a part of the second target data (namely, the translation data), as shown in FIG. 5.

(2) Mosaic processing is performed on the mask layer.

Figure 6:
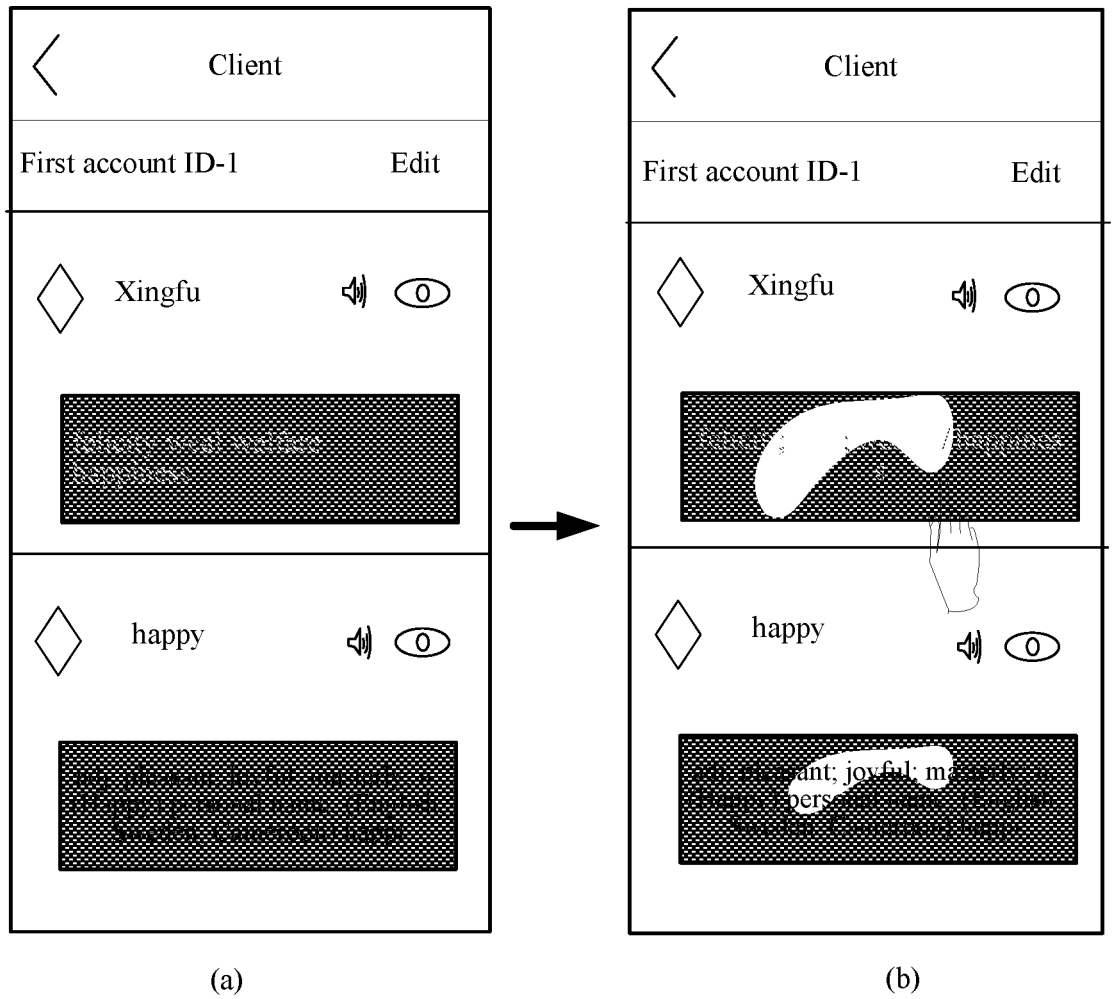
FIG. 6 is a schematic diagram of another optional data display method according to an embodiment of this application.

Specifically, descriptions are provided with reference to (a) and (b) in FIG. 6. An example in which the method is applied to an application client for language translation is used. Each entry includes first target data (namely, original data) and second target data (namely, translation data), and each piece of second target data (namely, the translation data) is hidden by a covering layer. As shown in (a) in FIG. 6, the generated mask layer may be a layer obtained after the Mosaic processing. If the first target data and the second target data are located on the same layer, the second target data of the corresponding entry is covered with an independent layer obtained after the Mosaic processing. If the first target data and the second target data are on two separate layers, the Mosaic processing is performed on a layer on which the second target data is located. Correspondingly, after the user operation performed on the layer is obtained, the target region may be determined based on the user operation, for example, a touchscreen sliding operation is performed. If the first target data and the second target data are located on the same layer, an independent layer obtained after Gaussian blur processing and covering the second target data is removed; or if the first target data and the second target data are on two separate layers, restoration processing is performed on a layer on which the second target data is located, to restore, through the user operation, the second target data hidden in the target region, to display a part of the second target data (namely, the translation data), as shown in (b) in FIG. 6.

(3) The mask layer is configured as an image displayed with predetermined content.

Figure 7:
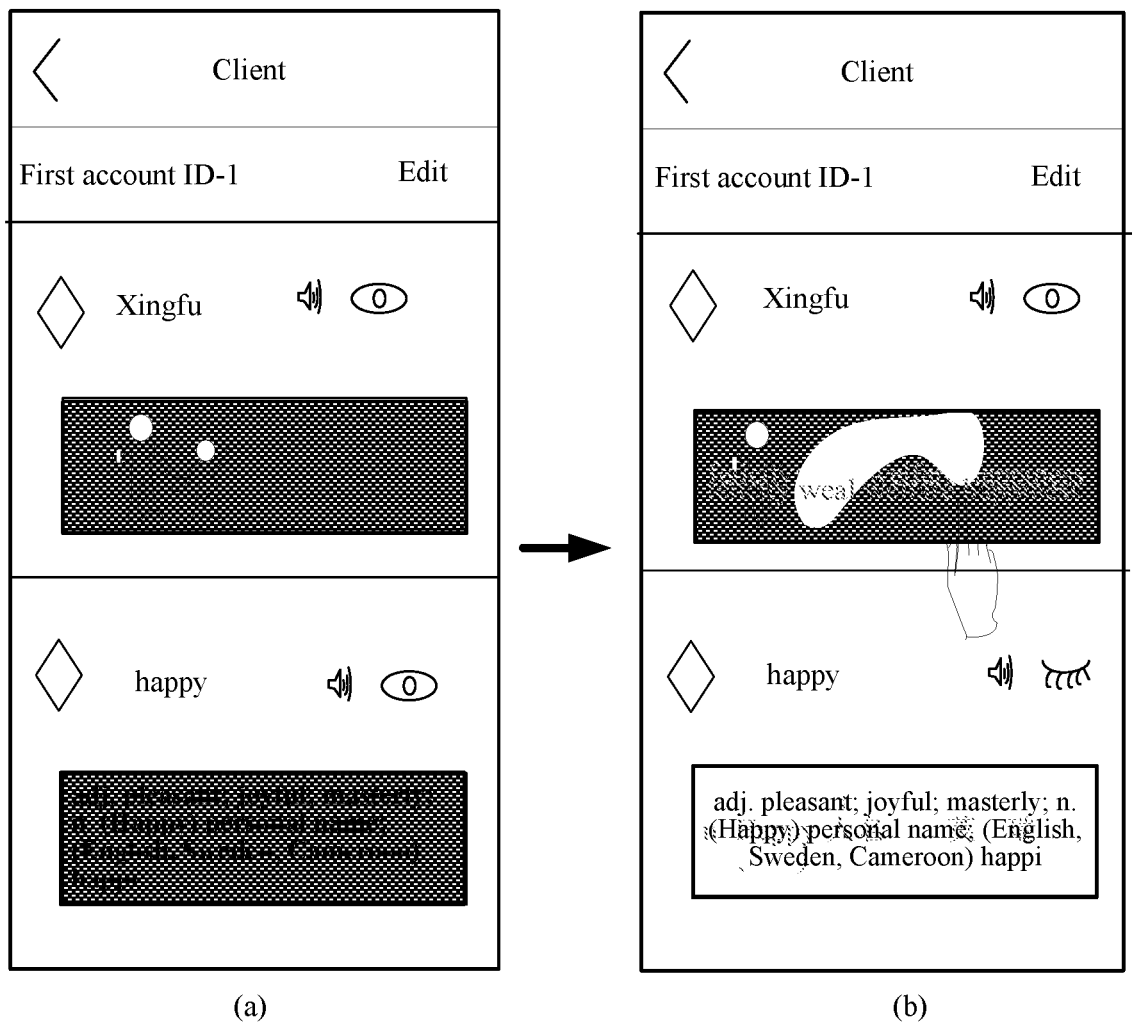
FIG. 7 is a schematic diagram of still another optional data display method according to an embodiment of this application.

Specifically, descriptions are provided with reference to (a) and (b) in FIG. 7. An example in which the method is applied to an application client for language translation is used. Each entry includes first target data (namely, original data) and second target data (namely, translation data), and each piece of second target data (namely, the translation data) is hidden by a covering layer. As shown in (a) in FIG. 7, the generated layer may be a layer including the image including the predetermined content, and the second target data of the corresponding entry is covered with the layer. After the user operation performed on the layer is obtained, the target region may be determined based on the user operation, for example, a touchscreen sliding operation is performed, to remove the layer from the target region, so as to display a part or all of the second target data (namely, the translation data), as shown in (b) in FIG. 7. A layer for a second piece of second target data is totally removed, so that all content of the second target data is displayed. It should be noted that, a layer identifier corresponding to the second target data may also be correspondingly adjusted. For example, if the identifier is "eye-open", it indicates that all of the data can be displayed after the identifier is tapped, or if the identifier is "eye-closed", it indicates that all of the data can be hidden after the identifier is tapped. As shown in (b) in FIG. 7, all of the second target data is already displayed, and the layer identifier is also correspondingly displayed as "eye-closed", to help restore to a display mode with the covering layer.

It should be noted that, the predetermined content may include, but is not limited to, a commercial advertisement for promotion, a public service advertisement, or the like, for example, as shown in FIG. 7. In addition, the predetermined content may also be prompt information related to the currently covered second target data, or the like. The foregoing description is merely an example, and this is not limited in one embodiment.

According to one embodiment provided in this application, the matching mask layer is generated for the second target data, so that the generated mask layer completely covers the corresponding second target data, without occupying additional display space, thereby improving utilization of display space of the display interface. In addition, layers of different styles are generated, or other predetermined content is displayed by reusing the layer. This enriches displayed content and improves a display effect, to attract more attention.

In an optional solution, the displaying a requested entry in a display interface in response to the data display request includes the following step:

S1: Display the entry satisfying a predetermined condition in the display interface, where the predetermined condition is carried in the data display request.

Optionally, in one embodiment, the displaying the entry satisfying a predetermined condition in the display interface includes at least one of the following:

(1) displaying, in the display interface, the entry stored at a predetermined storage time;

(2) displaying, in the display interface, the entry marked by using a predetermined identifier; or (3) displaying, in the display interface, the entry whose operation frequency is greater than a predetermined threshold.

In a specific application scenario, an example in which the method is applied to an application client for language translation is used. To conveniently filter entries, generally, a predetermined condition needs to be set for an entry. Generally, some predetermined conditions may be set in the data display request. For example, the entry stored at the predetermined time or an entry stored within a predetermined period of time may be displayed in the display interface. The predetermined period of time may be specifically a time limit of one day, one week, or one month. In addition, the entry marked by the user by using the predetermined identifier may also be displayed. Specifically, in the application client for language translation, the entry may be an unfamiliar word or sentence or the like, or may be an entry marked by the user and to be particularly memorized, or the like. On the other hand, the predetermined condition may be that the entry whose operation frequency is greater than the predetermined threshold is displayed in the display interface. Specifically, in the application client for language translation, an entry in entries that are collected by the user and whose operation frequency is greater than a particular threshold may be displayed. Specifically, this may be set based on practical experience.

According to one embodiment provided in this application, the entry satisfying the predetermined condition is displayed in the display interface, to rapidly select and display an entry meeting a user requirement, so as to simplify a searching operation, thereby reducing a searching time, achieving a rapid display effect, and improving use experience of the user.

In an optional solution, the determining a target region based on a user operation performed on the mask layer (e.g., user operation directed to or performed on the space designated for the second target data) includes the following steps:

S1: Obtain an operation mode of the user operation performed on the mask layer.

S2: Determine, based on the operation mode, the target region matching the user operation.

Optionally, the determining, based on the operation mode, the target region matching the user operation includes the following cases:

In an optional implementation, the determining, based on the operation mode, the target region matching the user operation includes the following steps:

S1: Obtain, if the operation mode indicates that the operation performed on the mask layer is a touchscreen sliding operation, a first track generated according to the touchscreen sliding operation performed on the mask layer.

S2: Determine, based on the first track, the target region matching the touchscreen sliding operation.

Optionally, in one embodiment, a track width of the first track may be a preset width, or may be a width matching touchscreen pressure applied by the touchscreen action. Higher touchscreen pressure indicates a wider track. The foregoing description is merely an example, and this is not limited in one embodiment. In some scenarios, the area slid or pass through by the sliding operation may include part within the mask layer and part outside the mask layer. The part slid area within the mask layer may be considered as the target region.

Specifically, descriptions are provided with reference to (a) and (b) in FIG. 6, and each piece of second target data shown in (a) in FIG. 6 is hidden. Assuming that the obtained operation mode of the user operation performed on the mask layer indicates the touchscreen sliding operation, and a sliding track of the touchscreen sliding operation on the mask layer is shown in (b) in FIG. 6. The touchscreen sliding operation is performed on a mask layer on translation data of a first entry "Xingfu" in the display screen, where touchscreen pressure applied by the touchscreen action is higher, and a corresponding track is also wider; and the touchscreen sliding operation is also performed on a mask layer on translation data of a second entry "happy", where touchscreen pressure applied by the touchscreen action is lower, and a corresponding track is also narrower. The target region matching the touchscreen sliding operation is determined based on the track corresponding to the touchscreen action.

It should be noted that, the touchscreen sliding operation may be, but is not limited to, a tap operation or an operation of continuous sliding. The corresponding first track may be, but is not limited to the following: (1) When the touchscreen sliding operation is continuous sliding, the first track is obtained based on a moving track formed during the sliding, to use the first track as the target region. (2) When the touchscreen sliding operation is a tap operation, the first track is obtained based on an operation position of the tap operation, to use the first track as the target region. For example, when the touchscreen sliding operation is tapping, a circular moving track, namely, a circular region or an elliptical region with a tap position as a circle center may be displayed. This is not limited herein in one embodiment.

It should be noted that, in one embodiment, the touchscreen sliding operation may also be referred to as a smearing operation and the corresponding moving track may be obtained based on a smearing track that is generated after the smearing operation is performed on the mask layer, but this is not limited thereto. The foregoing description is merely an example, and this is not limited in one embodiment.

According to one embodiment provided in this application, if the operation mode indicates that the operation performed on the mask layer is the touchscreen sliding operation, the first track that is generated after the touchscreen action is performed on the mask layer through the touchscreen sliding operation is obtained, and the target region matching the touchscreen sliding operation is determined based on the first track, to determine the target region based on the first track generated by the touchscreen action, so as to display the second target data in the target region. The touchscreen sliding operation (namely, the smearing operation) is performed to flexibly control the generated track (namely, the smearing track), so as to flexibly control the second target data displayed in the target region covered by the track (namely, the smearing track), thereby improving a memorization effect.

In another optional implementation, the determining, based on the operation mode, the target region matching the user operation includes the following steps:

S1: Obtain, if the operation mode indicates that the operation directed to the mask layer is an air pressure sensing operation, a second track generated according to the air pressure sensing operation.

S2: Determine, based on the second track, the target region matching the air pressure sensing operation.

Optionally, in one embodiment, if a first sensing region generated according to the air pressure sensing operation is obtained, the second track is determined based on a position of the first sensing region. An area of the first sensing region matches air flow pressure indicated by the air pressure sensing operation.

Figure 8:
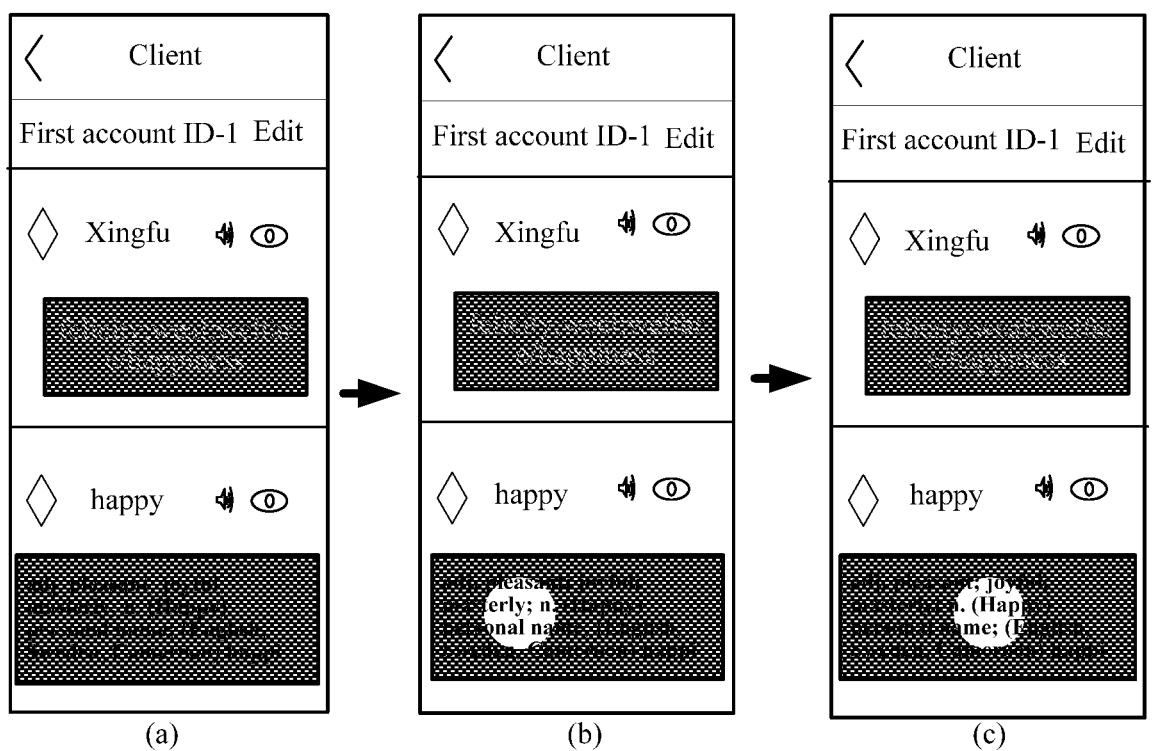
FIG. 8 is a schematic diagram of still another optional data display method according to an embodiment of this application.

Specifically, descriptions are provided with reference to (a) to (c) in FIG. 8, and each piece of second target data shown in (a) in FIG. 8 is hidden. Assuming that the obtained operation mode of the user operation directed to the mask layer indicates the air pressure sensing operation, and the air pressure sensing operation is performed only once, a first sensing region (a transparent circle shown in the figure) shown in (b) in FIG. 8 is generated on the layer. Higher air flow pressure indicated by the air pressure sensing operation indicates a larger area of the first sensing region (to be specific, a larger radius of the sensing region). The first track is determined based on a position of the first sensing region. For example, after the first sensing region is driven to move from a position shown in (b) in FIG. 8 (for example, the first sensing region is slid) to a position shown in (c) in FIG. 8, during the movement of the first sensing region, an area of the target region covered by the first track is always the same as the area of the first sensing region, and the position of the first sensing region is always determined as the target region.

Optionally, in one embodiment, if a first sensing region generated according to the air pressure sensing operation is obtained, the second track is determined based on a moving track of the first sensing region. An area of the first sensing region matches air flow pressure indicated by the air pressure sensing operation.

Figure 9:
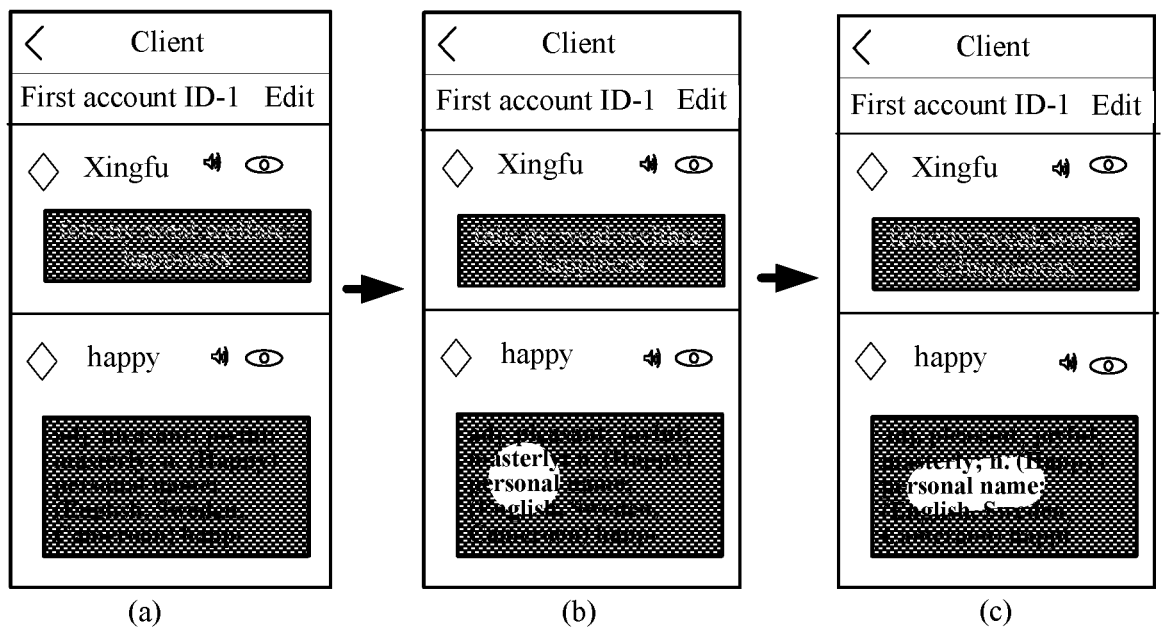
FIG. 9 is a schematic diagram of still another optional data display method according to an embodiment of this application.

Specifically, descriptions are provided with reference to (a) to (c) in FIG. 9, and each piece of second target data shown in (a) in FIG. 9 is hidden. Assuming that the obtained operation mode of the user operation directed to the mask layer indicates the air pressure sensing operation, and the air pressure sensing operation is performed only once, a first sensing region (a transparent circle shown in the figure) shown in (b) in FIG. 9 is generated on the mask layer. Higher air flow pressure indicated by the air pressure sensing operation indicates a larger area of the first sensing region. The target region is determined based on a moving track of the first sensing region. For example, after the first sensing region is driven to move from a position shown in (b) in FIG. 9 (for example, the first sensing region is slid) to a position shown in (c) in FIG. 9, a second track may be obtained based on a region covered by the moving track of the first sensing region on the mask layer, and the target region matching the air pressure sensing operation is determined based on the second track corresponding to the first sensing region, to display the second target data matching the target region.

Optionally, in one embodiment, if at least two first sensing regions generated according to the air pressure sensing operation are obtained, the second track is determined based on positions of the at least two first sensing regions. An area of the first sensing region matches air flow pressure indicated by the air pressure sensing operation.

Figure 10:
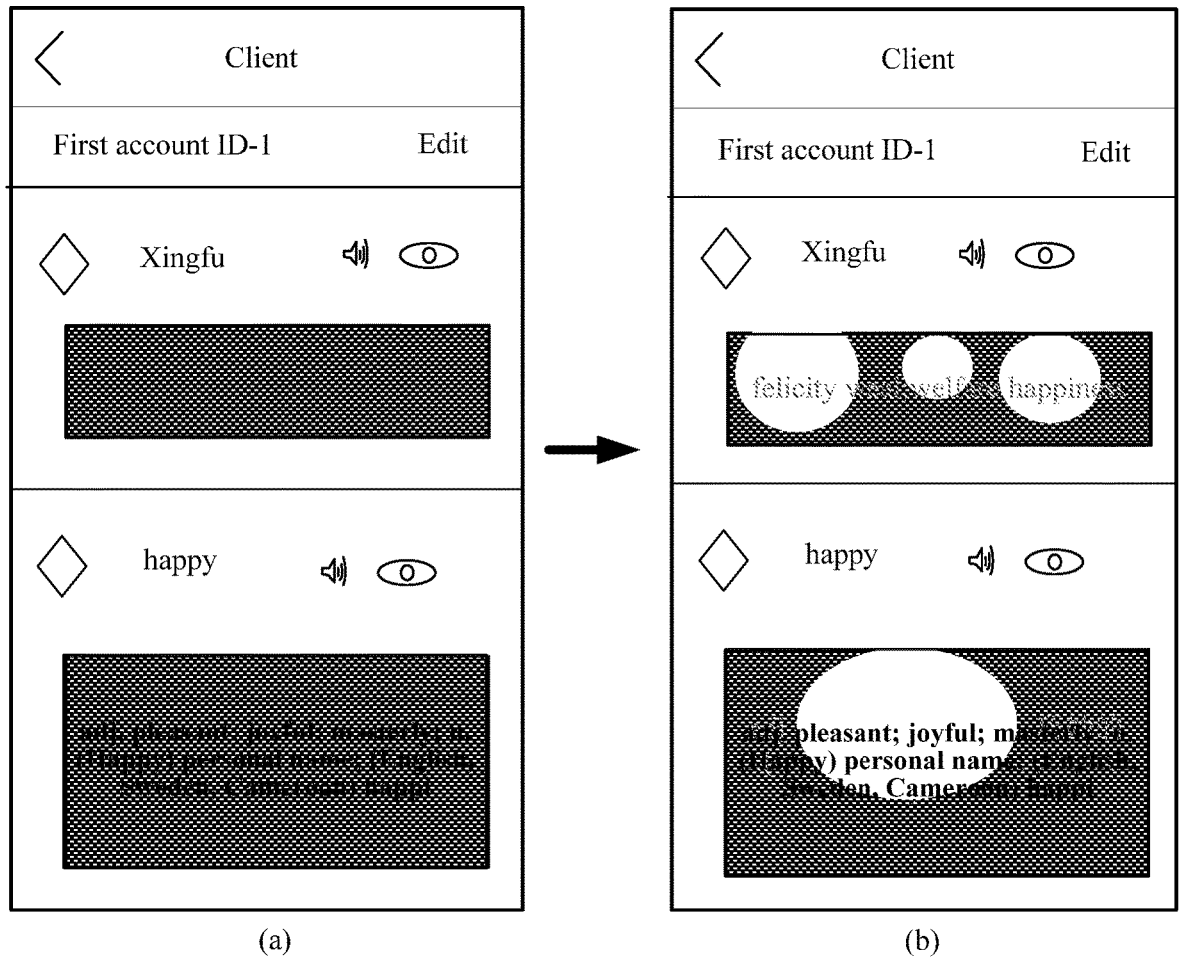
FIG. 10 is a schematic diagram of still another optional data display method according to an embodiment of this application.

Specifically, descriptions are provided with reference to (a) and (b) in FIG. 10, and each piece of second target data shown in (a) in FIG. 10 is hidden. Assuming that the obtained operation mode of the user operation directed to the mask layer indicates the air pressure sensing operation, and the air pressure sensing operation is performed a plurality of times, a plurality of first sensing regions (transparent circles shown in the figure) shown in (b) in FIG. 10 is generated on the mask layer. Higher air flow pressure indicated by the air pressure sensing operation indicates a larger area of the first sensing region. A second track shown in (b) in FIG. 10 is obtained based on positions of the plurality of first sensing regions, and the target region matching the air pressure sensing operation is determined based on the second track, to display the second target data matching the target region.

According to one embodiment provided in this application, if the operation mode indicates that the operation performed on the layer is the air pressure sensing operation, the second track that is generated after the blowing action is performed on the layer through the air pressure sensing operation is obtained; and the second track is determined based on the moving track of the first sensing region, to determine, based on the second track, the target region matching the air pressure sensing operation; or after the at least two first sensing regions that are generated after the blowing action is performed on the layer are obtained, the second track is determined based on the positions of the at least two first sensing regions; and the air pressure sensing operation is performed on the layer, to generate the first sensing region matching the air flow pressure indicated by the air pressure sensing operation, so as to determine, based on the position and/or the moving track of the first sensing region, the target region matching the air pressure sensing operation. The target region matching the air pressure sensing operation is determined based on the second track, to remove the layer from the target region, so as to display the second target data in the target region. The air pressure sensing operation is performed, to flexibly control the generated moving track, so as to flexibly control the second target data displayed in the target region covered by the moving track, thereby improving a memorization effect.

In still another optional implementation, the determining, based on the operation mode, the target region matching the user operation includes the following steps:

S1: Obtain, if the operation mode indicates that the operation directed to the mask layer is a vibration sensing operation, a third track based on a reference point on the mask layer according to the vibration sensing operation.

S2: Determine, based on the third track, the target region matching the vibration sensing operation.

It should be noted that, after the obtained operation mode indicates that the operation performed on the layer is the vibration sensing operation, the reference point based on the layer for the vibration sensing operation is first determined, and may be any vertex of a layer matching a first piece of second target data in the current display interface, or a position of the reference point may be voluntarily set by the user; then, the third track that is generated after the vibration action is performed based on the reference point on the layer through the vibration sensing operation is obtained. If the terminal is a mobile phone, the vibration action may be performed through "Shake". A higher vibration frequency and/or higher vibration strength of the vibration sensing operation indicates a larger area of the third track generated based on the reference point. Then, the target region matching the vibration sensing operation is determined based on the third track, to display the second target data in the target region. For example, after the current second target data is completely displayed, a position of a reference point corresponding to a next piece of second target data is moved to, or a position of a next reference point selected by the user is obtained.

Optionally, in one embodiment, the reference point may be, but is not limited to, any point on the layer. A vibration frequency and/or vibration strength of the terminal is obtained through a built-in speed and force sensor in the terminal, to generate the third track through movement relative to the reference point. For example, with the reference point as a circle center, a radius relative to the reference point is determined based on the vibration frequency and/or the vibration strength, to generate the corresponding third track based on the reference point.

According to one embodiment provided in this application, if the operation mode indicates that the operation performed on the layer is the vibration sensing operation, the third track that is generated after the vibration action is performed based on the reference point on the layer through the vibration sensing operation is obtained; and the target region matching the vibration sensing operation is determined based on the third track, to remove the layer from the target region covered by the third track, so as to display the second target data in the target region. The vibration sensing operation is performed, to flexibly control the generated moving track, so as to flexibly control the second target data displayed in the target region covered by the moving track, thereby improving a memorization effect.

In an optional solution, before the displaying a requested entry in a display interface in response to the data display request, the method further includes at least one of the following:

(1) displaying prompt information on the display interface, where the prompt information is used to prompt whether to perform the user operation; and displaying the entry in the display interface if it is determined to perform the user operation; or (2) obtaining an operation instruction that is generated by performing a tap operation on an operation button displayed in the display interface; and displaying the entry in the display interface in response to the operation instruction, where the operation button is used to instruct to perform the user operation.

It should be noted that, in one embodiment, the entry may be, but is not limited to, a target entry collected by a first account of the user to the client in advance, or may be a locally stored target entry in the client by the user. Before the collection interface is entered to display the entry, the foregoing steps may be performed, but this is not limited thereto, to determine whether to display an entry with second target data covered with a layer in the collection interface.

Figure 11:
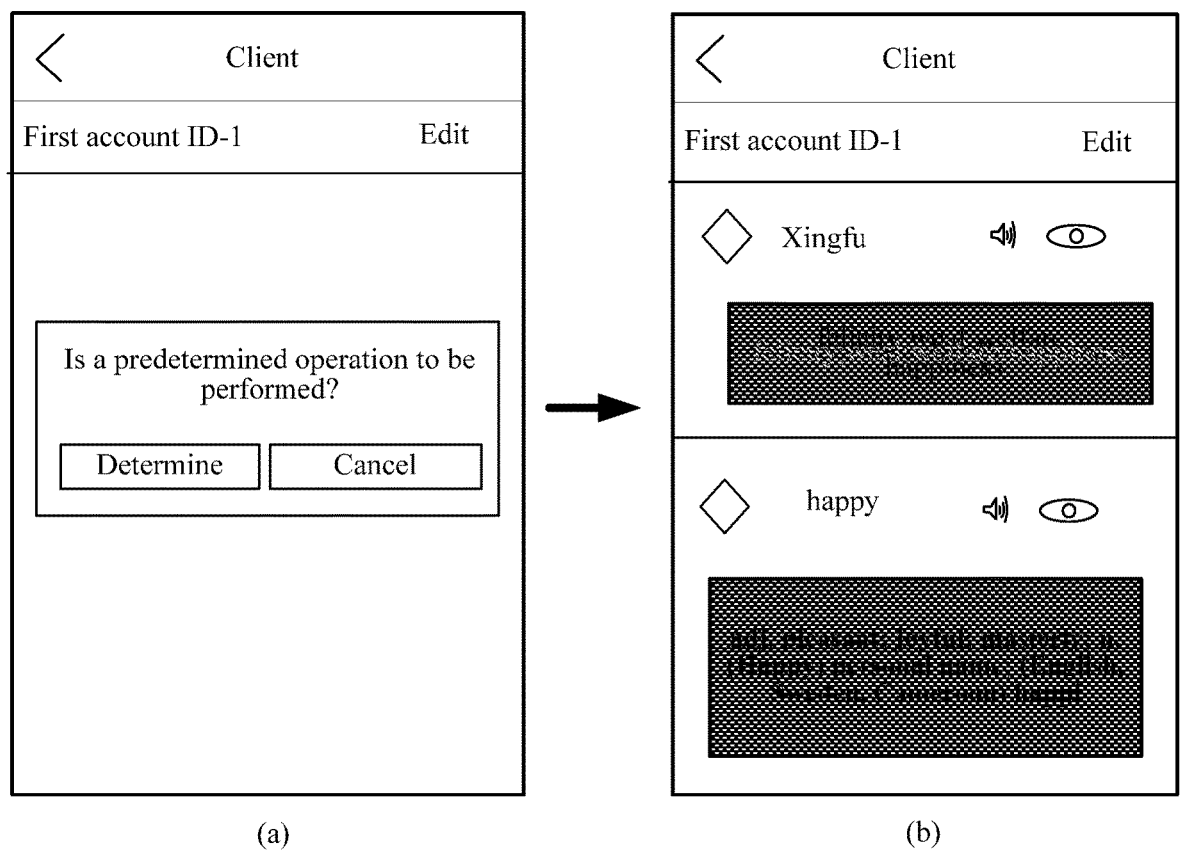
FIG. 11 is a schematic diagram of still another optional data display method according to an embodiment of this application.

Specifically, descriptions are provided with reference to (a) and (b) in FIG. 11. Assuming that after the data display request is obtained, and before the collection interface is entered to display the entry, prompt information shown in (a) in FIG. 11 is displayed through a pop-up window, to prompt the user "whether to perform the user operation" (a "smearing" operation is used as an example), and if it is determined to perform the user operation, the entry with the second target data covered with the mask layer is displayed, as shown in (b) in FIG. 11.

In addition, in one embodiment, the operation button used to perform the user operation may be provided in the display interface, but this is not limited thereto. For example, after the collection interface is entered, after a "smearing button" is tapped, the entry with the covering mask layer is displayed in the collection interface.

According to one embodiment provided in this application, the interface having the entry with the second target data covered with the mask layer is entered in different manners, to improve display diversity and enrich a display manner.

In an optional solution, if a plurality of entries is requested, before the displaying a requested entry in a display interface in response to the data display request, the method further includes the following steps:

S1: Update sorting identifiers of the plurality of entries, where the sorting identifiers are determined based on storage time of the entries and/or operation frequency at which the user operation is performed on the entries.

S2: Update an arrangement order of the plurality of entries based on the sorting identifiers.

Optionally, in one embodiment, the updating sorting identifiers respectively corresponding to the plurality of entries includes at least one of the following:

(1) updating, when a newly added entry is detected, the sorting identifiers respectively corresponding to the plurality of entries; or (2) updating, after the user operation is performed on at least one of the plurality of entries, the sorting identifiers corresponding to the plurality of entries.

It should be noted that, in a specific application scenario, an entry may also exist in a form of a list. Therefore, for ease of description below, in one embodiment, an entry list is used to describe entry arrangement.

Figure 12:
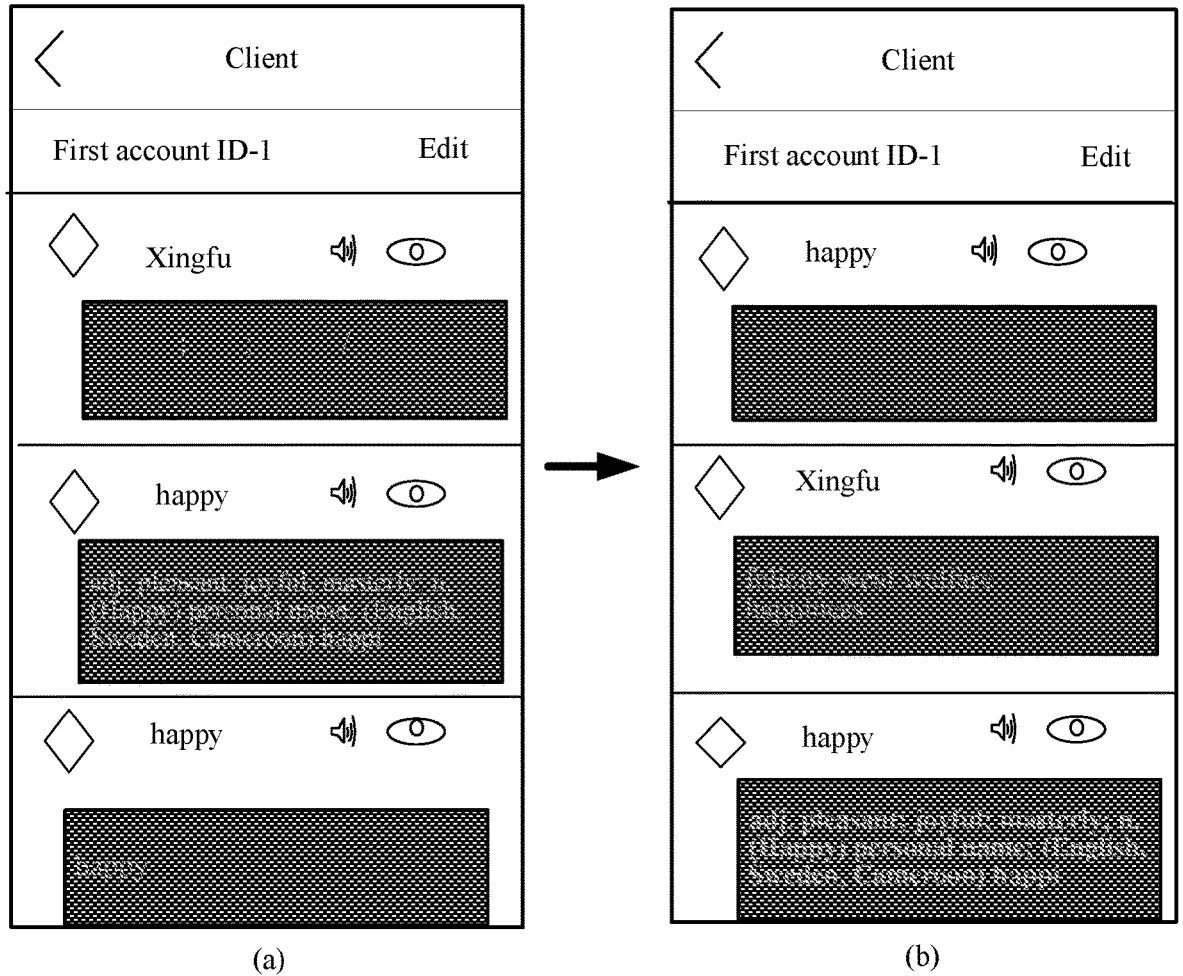
FIG. 12 is a schematic diagram of still another optional data display method according to an embodiment of this application.

Specifically, descriptions are provided with reference to FIG. 12. Assuming that an entry list shown in (a) in FIG. 12 is obtained based on storage timestamps, after the touchscreen sliding operation (namely, the smearing operation) is frequently performed on an entry "Kaixin" for memorization, a sorting identifier of the entry "Kaixin" is updated, and the entry list is also updated, to obtain an entry list shown in (b) in FIG. 12.

Optionally, in one embodiment, the sorting identifier may be, but is not limited to, a sorting score (sort_score) matching each entry. The sorting score may be dynamically calculated based on the storage time (collect_date) of the entry and the operation frequency (action_count) at which the user operation (for example, the smearing operation) is performed on the entry, but this is not limited thereto, to ensure that a newly added entry and an entry operated at high frequency can be displayed in priority. In one embodiment, the storage time may be, but is not limited to, a time at which the entry is collected to the entry list. The foregoing description is merely an example, and this is not limited in one embodiment.

In an optional embodiment, the sorting score (sort_score) may be calculated based on the following formula, but this is not limited thereto:

days_ago=(now−collect_date)·days( );

action_score=1+ln(1+action_count);

score_factor=1+(2/(1+days_ago)/7)); and sort_score=score_factor*action_score.

It should be noted that, in one embodiment, there is a linear relationship between the sorting score sort_score and the storage time, and a shorter storage time indicates a higher sorting score, to control a newly collected entry to be displayed in priority based on the linear relationship. There is a nonlinear relationship between the sorting score sort_score and the operation frequency, and higher operation frequency indicates a higher sorting score, to display an entry operated at high frequency in priority in the entry list without increasing calculation load if a value of the operation frequency is controlled based on the nonlinear relationship.

According to one embodiment provided in this application, the arrangement order of the entry list is updated in real time, to ensure that a newly added entry and an entry operated at high frequency in the entry list can be displayed in priority in the entry list, thereby improving a display effect, and more facilitating memorization by the user.

In an optional solution, before the obtaining a data display request, the method further includes the following steps:

S1: Obtain an entry collection request, where the entry collection request carries a hash value matching a target entry to be collected, and the hash value is determined based on the first target data in the target entry, a data type of the first target data, and a data type of the second target data.

S2: Search for the target entry based on the hash value.

S3: Collect the target entry when the target entry is not found.

Optionally, in one embodiment, the hash value matching the target entry may be determined based on the first target data in the target entry, the data type of the first target data, and the data type of the second target data, but this is not limited thereto. For example, a hash value (hashcode) uniquely corresponding to the target entry is generated based on the first target data (such as original data "tree"), the data type (such as a source language type (for example, EN)) of the first target data, and the data type (such as a target language type (for example, (CN)) of the second target data by using a hash algorithm.

Figure 13:
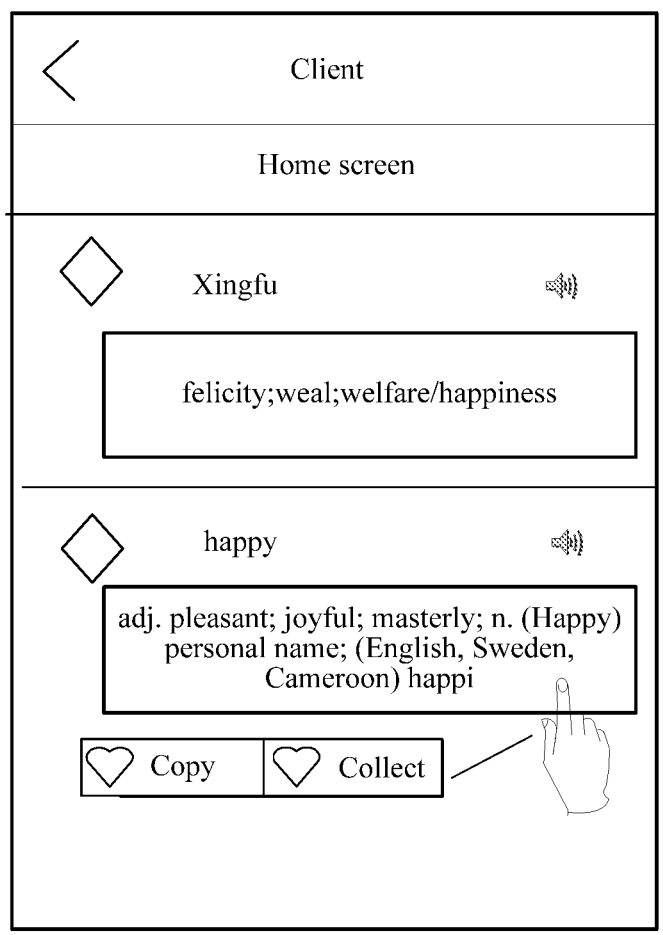
FIG. 13 is a schematic diagram of still another optional data display method according to an embodiment of this application.

Optionally, in one embodiment, in an entry displayed on a home screen, a target entry that interests the user may be tapped, to implement a collection and storage operation on the target entry, but this is not limited thereto. As shown in FIG. 13, an entry "happy" that interests the user may be tapped, and then, an operation tool bar corresponding to the entry "happy" is displayed on the home screen. As shown in FIG. 13, after a "collection button" is tapped, a collection operation may be performed on the entry "happy". In addition, if the current entry is already collected, a collection cancelation operation may be performed through the tap operation.

In a process of collecting the target entry, a hash value hashcode corresponding to the entry "happy" is obtained, and all prestored entries are searched for the entry "happy". For example, searching is performed by using a marker bit is_collect. If the marker bit is_collect of the corresponding entry is not found, the collection operation is performed, and the marker bit is_collect is correspondingly changed, for example, the marker bit is_collect is changed to "1"; or if the marker bit is_collect of the corresponding entry is found, the collection cancelation operation is performed, and the marker bit is_collect is correspondingly changed, for example, the marker bit is_collect is changed to and marked as "0".

According to one embodiment provided in this application, a unique hash value is configured for the entry, to avoid repeated storage of the same entry, thereby saving storage space and implementing deduplication.

It should be noted that, for brief description, the foregoing method embodiments are represented as a series of action combinations. However, a person skilled in the art should appreciate that this application is not limited to the described order of the actions, because according to this application, some steps may be performed in other orders or performed at the same time. In addition, a person skilled in the art should also know that all the embodiments described in this specification are optional embodiments, and the related actions and modules are not necessarily mandatory to this application.

Based on the descriptions of the foregoing implementations, a person skilled in the art may clearly understand that the methods according to the foregoing embodiments may be implemented by software and a necessary universal hardware platform or by hardware only. However, in most cases, the former is a preferred implementation. Based on such an understanding, the technical solutions of this application essentially or the part contributing to the related technology may be implemented in a form of a software product. The computer software product is stored in a storage medium (such as a read-only medium (ROM)/a random access memory (RAM), a magnetic disk, or an optical disc) and includes several instructions for instructing a terminal device (which may be a mobile phone, a computer, a server, a network device, or the like) to perform the methods described in the embodiments of this application.

Figure 14:
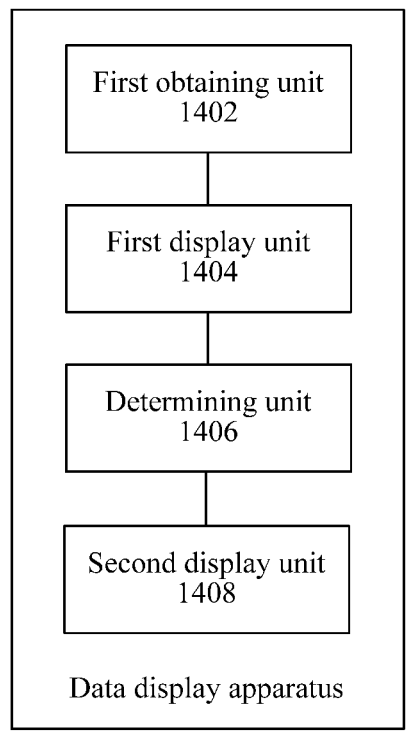
FIG. 14 is a schematic diagram of an optional data display apparatus according to an embodiment of this application.

According to another aspect of the embodiments of this application, a data display apparatus configured to perform the foregoing data display method is further provided. As shown in FIG. 14, the apparatus includes:

(1) a first obtaining unit 1402, configured to obtain a data display request;

(2) a first display unit 1404, configured to obtain an entry in response to the data display request, the entry including first target data and second target data, there being a predetermined association relationship between the first target data and the second target data, and display the first target data in a display interface; designate a space on the display interface for the second target data; and generate a mask layer; the mask layer having a size matching the designated space and covering the second target data;

(3) a determining unit 1406, configured to determining a target region based on a user operation performed on the designated space; and (4) a second display unit 1408, configured to display the second target data in the target region.

Optionally, in one embodiment, the data display apparatus is applicable to, but not limited to, an application client for data conversion, for example, an application client for language translation. Herein, it should be noted that, the data display apparatus is also applicable to another application client for data conversion. An entry displayed in these application clients includes first target data and second target data that have a predetermined association relationship, for example, classical Chinese poetry and modern literature, words, idioms, proverbs, and the like and corresponding analysis, drawing reading for children and a name and a funny game, and other corresponding data having an association relationship. The association relationship between the first target data and the second target data may be set based on practical experience or a user requirement, for example, may be a translation, an explanation, or a description. This is not limited herein in one embodiment.

In addition, in one embodiment, the first target data, the second target data, and the association relationship between the first target data and the second target data in the entry may be flexibly configured in a client, without being limited to obtaining an entry with an association relationship fixed in advance. It should be noted that, the first target data in the entry may be a word, a word combination, a sentence, or an image. This is not limited in one embodiment. In one embodiment, the entry is not limited to including only two pieces of data, namely, the first target data and the second target data, but may include a plurality of pieces of target data such as the first target data, the second target data, and third target data. There is an association relationship between the plurality of pieces of target data included in the entry. At least one piece of target data is hidden.

In a specific application scenario, the foregoing application client for language translation is used as an example. After the application client obtains a data display request, the client displays a requested entry in a display interface in response to the data display request. Each entry includes first target data (namely, original data) and second target data (namely, translation data), there is a predetermined association relationship between the first target data (namely, the original data) and the second target data (namely, the translation data), and the second target data (namely, the translation data) is hidden by a mask layer in the display interface of the client. The mask layer matches the second target data (namely, the translation data), to block the second target data (namely, the translation data) to hide the second target data. Then the client determines a target region based on a user operation performed on the mask layer, to display the second target data (namely, the translation data) in the target region. A track generated by performing the user operation on the mask layer may be obtained, a region covered by the track may be used as the target region, and the mask layer may be removed from the target region, to display the second target data in the target region, so that the second target data to be displayed in the display interface of the client is flexibly controlled based on the track corresponding to the user operation.

It should be noted that, in one embodiment, a requested entry is displayed in a display interface in response to a data display request, the entry including first target data and second target data, there being a predetermined association relationship between the first target data and the second target data, and the second target data being hidden by a mask layer in the display interface; and then a user operation is performed on the mask layer matching the second target data, and a target region is determined based on the user operation, to display the second target data in the target region. To be specific, after the requested entry is displayed, where the second target data in the entry is hidden in the display interface, the user operation is performed on the mask layer matching the second target data, and the target region used to display the second target data is determined based on the user operation, to flexibly control the second target data to be displayed, and further help repeatedly memorize the second target data, without being limited to displaying the second target data all at once, thereby overcoming a problem of relatively low data display flexibility in a related technology.

Optionally, in one embodiment, the mask layer matching the second target data may be, but is not limited to, an independent layer covering the second target data. In other words, the first target data and the second target data are on the same layer, and the second target data is covered with another layer. After predetermined image processing is performed on the layer (the independent layer covering the second target data), the layer is used to cover the second target data, so that the second target data is hidden in the display interface. To be specific, the second target data covered with the layer is displayed by performing an operation of removing the layer.

It should be noted that, the predetermined image processing may include, but is not limited to, the following processing performed on the mask layer: Gaussian blur processing, Mosaic processing, or configuring the mask layer as an image displayed with predetermined content. The predetermined content may include, but is not limited to, a commercial advertisement, a public service advertisement, prompt information used to prompt for the second target data, and the like. This is not limited herein.

To be specific, to achieve a blocking effect, the mask layer covering the second target data may be a first layer obtained after the Gaussian blur processing, or may be a second layer obtained after the Mosaic processing, or may be a layer including the image displayed with the predetermined content. The foregoing description is merely an example, and another form of another layer for achieving the blocking effect is not limited in one embodiment.

In addition, in one embodiment, the mask layer matching the second target data may also be, but is not limited to, an original layer carrying the second target data (a layer on which the second target data is located). In other words, the first target data and the second target data are on two separate layers. After predetermined image processing is performed on the layer (the layer on which the second target data is located), the second target data is hidden in the display interface. To be specific, an inverse operation is performed on the predetermined image processing process, to display the second target data on the layer. It should be noted that, the predetermined image processing may include, but is not limited to, stamping garbled characters, a pattern, and the like on the layer on which the second target data is located, to fuzzily display the second target data in the display interface through hybrid display, thereby implementing hidden display.

Optionally, in one embodiment, the displaying a requested entry in a display interface in response to the data display request may include, but is not limited to, displaying the entry satisfying a predetermined condition in the display interface, where the predetermined condition is carried in the data display request.

It should be noted that, in one embodiment, the entry satisfying the predetermined condition may include, but is not limited to, at least one of the following: the entry stored at a predetermined storage time, the entry marked by using a predetermined identifier, or the entry whose operation frequency is greater than a predetermined threshold. The foregoing description is merely an example, and in one embodiment, another predetermined condition may also be configured. This is not limited herein.

Optionally, in one embodiment, the determining a target region based on a user operation performed on the mask layer specifically includes: first obtaining an operation mode of the user operation performed on the mask layer, where the operation mode may be a touchscreen sliding operation, a blowing sensing operation, a shaking or vibration sensing operation, a sound control operation, or the like; and after obtaining the current operation mode, determining, based on the operation mode, the target region matching the user operation.

It should be noted that, the foregoing operation manner is merely an example of the operation mode in one embodiment. In one embodiment, the operation mode may be a separate operation manner such as only the touchscreen sliding operation, or may be a combination of a plurality of operation manners such as a combination of the touchscreen sliding operation and the blowing operation. A specific operation manner and a specific combination manner are not limited herein.

Optionally, in one embodiment, the determining, based on the operation mode, the target region matching the user operation may include the following:

(1) Touchscreen Sliding Operation

It should be noted that, in a process of performing the touchscreen sliding operation, a track width of the touchscreen sliding operation on a display screen may be preset based on a user requirement, or may be set based on pressure applied by the touchscreen sliding operation to a display screen. The foregoing description is merely an example, and another form of setting a track width of another touchscreen sliding operation is not limited in one embodiment.

In addition, in a process in which a user performs the touchscreen sliding operation, the touchscreen sliding operation may be, but is not limited to, a tap operation or an operation of continuous sliding. When the touchscreen sliding operation is continuous sliding, the target region may be obtained based on a moving track formed during the sliding. When the touchscreen sliding operation is a tap operation, the target region may also be obtained based on an operation position of the tap operation. For example, a track determining manner corresponding to the tap operation may be preset. Specifically, when the touchscreen sliding operation is tapping, a circular moving track, namely, a circular region or an elliptical region with a tap position as a circle center may be displayed, or a moving track in one row may be displayed. A radius, a length, a width, a shape, and the like of a specific moving track may be set based on practical experience. This is not limited herein.

(2) Air Pressure Sensing Operation

It should be noted that, in a process of performing the air pressure sensing operation, the corresponding target region is determined based on a position of the first sensing region and/or a moving track. An example is described below. (1) If a first sensing region that is generated after a blowing action is performed on the mask layer is obtained, the target region is determined based on a position of the first sensing region. To be specific, during movement of the first sensing region, the position of the first sensing region is always determined as the target region. (2) If a first sensing region that is generated after a blowing action is performed on the mask layer is obtained, the target region is determined based on a moving track of the first sensing region. To be specific, during movement of the first sensing region, the target region is determined based on the moving track of the first sensing region. (3) If at least two first sensing regions that are generated after a blowing action is performed on the mask layer are obtained, the target region is determined based on positions of the at least two first sensing regions. To be specific, a plurality of first sensing regions is successively generated, and positions of the plurality of first sensing regions are determined as the target region. The foregoing description is merely an example, and this is not limited in one embodiment.

(3) Vibration Sensing Operation

It should be noted that, in a process of performing the vibration sensing operation, a reference point on the mask layer is first determined, and a first sensing region matching the vibration sensing operation is generated on the mask layer based on the reference point. A higher vibration frequency and/or higher vibration strength of the vibration sensing operation indicates a larger area of the target region generated based on the reference point.

Optionally, in one embodiment, before the displaying a requested entry in a display interface in response to the data display request, one of the following may be further included, but this is not limited thereto:

(1) displaying prompt information on the display interface, where the prompt information is used to prompt whether to perform the user operation; and displaying the entry in the display interface if it is determined to perform the user operation; or (2) obtaining an operation instruction that is generated by performing a tap operation on an operation button displayed in the display interface; and displaying the entry in the display interface in response to the operation instruction after receiving the operation instruction, where the operation button is used to instruct to perform the user operation.

It should be noted that, in one embodiment, the entry may be, but is not limited to, a target entry collected to the client in advance, or may be a locally stored entry. Before a collection interface is entered to display the entry, the foregoing steps may be performed but this is not limited thereto, to determine whether to display an entry that is in the collection interface and in which second target data is covered with a mask layer.

Optionally, in one embodiment, before the obtaining a data display request, the following may be further included, but this is not limited thereto: updating sorting identifiers of a plurality of entries, where the sorting identifiers are determined based on storage time of the entries and/or operation frequency at which the user operation is performed on the entries; and then, updating an arrangement order of the plurality of entries based on the sorting identifiers. To be specific, an entry list is updated in real time, to ensure that the displayed entry list more meets a real-time requirement of a user, thereby improving display accuracy.

Optionally, in one embodiment, before the obtaining a data display request, the following may be further included, but this is not limited thereto: obtaining an entry collection request, where the entry collection request carries a hash value matching a target entry to be collected, and the hash value is determined based on the first target data in the target entry, a data type of the first target data, and a data type of the second target data; during the obtaining an entry collection request, first searching for the target entry based on the hash value; and collecting the target entry when the target entry is not found. To be specific, a hash value used to uniquely identify an entry in the collection interface is configured for the entry, to ensure uniqueness of the entry in the entry list based on the hash value.

According to one embodiment provided in this application, a requested entry is displayed in a display interface in response to a data display request, the entry including first target data and second target data, there being a predetermined association relationship between the first target data and the second target data, and the second target data being hidden using a mask layer in the display interface; and then a user operation is performed on the mask layer matching the second target data, and a target region is determined based on the user operation, to display the second target data in the target region. To be specific, after the requested entry is displayed, where the second target data in the entry is hidden in the display interface, the user operation is performed on the mask layer matching the second target data, and the target region used to display the second target data is determined based on the user operation, to flexibly control the second target data to be displayed, and further help repeatedly memorize the second target data, without being limited to displaying the second target data all at once, thereby overcoming a problem of relatively low data display flexibility in a related technology.

In an optional solution, the data display apparatus provided in one embodiment further includes:

(1) a generation unit, configured to generate the mask layer matching the second target data; and (2) a covering unit, configured to cover the second target data in the entry with the mask layer, so that the second target data is hidden when the entry is displayed in the display interface.

Optionally, in one embodiment, the mask layer matching the second target data may be generated based on preconfigured display layout information, but this is not limited thereto. A display height of the generated mask layer is a display height of the second target data, to save display space and improve space utilization, thereby improving a display effect.

Optionally, in one embodiment, the generation unit includes at least one of a first processing module, a second processing module, or a third processing module.

(1) The first processing module is configured to perform Gaussian blur processing on the mask layer based on a predetermined parameter.

Specifically, descriptions are provided with reference to FIG. 5. An example in which the apparatus is applied to an application client for language translation and the second target data is covered with an independent layer is used. Each entry includes first target data (namely, original data) and second target data (namely, translation data), and each piece of second target data (namely, the translation data) is hidden by a covering layer. As shown in FIG. 5, the generated layer may be a layer obtained after the Gaussian blur processing is performed based on the predetermined parameter, and the second target data of the corresponding entry is covered with the layer. After the user operation performed on the layer is obtained, the target region may be determined based on the user operation, for example, a touchscreen sliding operation is performed, to remove the layer from the target region, so as to display a part of the second target data (namely, the translation data), as shown in FIG. 5.

(2) The second processing module is configured to perform Mosaic processing on the mask layer.

Specifically, descriptions are provided with reference to (a) and (b) in FIG. 6. An example in which the apparatus is applied to an application client for language translation is used. Each entry includes first target data (namely, original data) and second target data (namely, translation data), and each piece of second target data (namely, the translation data) is hidden by a covering layer. As shown in (a) in FIG. 6, the generated layer may be a layer obtained after the Mosaic processing. If the first target data and the second target data are located on the same layer, the second target data of the corresponding entry is covered with an independent layer obtained after the Mosaic processing. If the first target data and the second target data are on two separate layers, the Mosaic processing is performed on a layer on which the second target data is located. Correspondingly, after the user operation performed on the layer is obtained, the target region may be determined based on the user operation, for example, a touchscreen sliding operation is performed. If the first target data and the second target data are located on the same layer, an independent layer obtained after Gaussian blur processing and covering the second target data is removed; or if the first target data and the second target data are on two separate layers, restoration processing is performed on a layer on which the second target data is located, to restore, through the user operation, the second target data hidden in the target region, to display a part of the second target data (namely, the translation data), as shown in (b) in FIG. 6.

(3) The third processing module is configured to configure the layer as an image displayed with predetermined content.

Specifically, descriptions are provided with reference to (a) and (b) in FIG. 7. An example in which the apparatus is applied to an application client for language translation is used. Each entry includes first target data (namely, original data) and second target data (namely, translation data), and each piece of second target data (namely, the translation data) is hidden by a covering layer. As shown in (a) in FIG. 7, the generated layer may be a layer including the image including the predetermined content, and the second target data of the corresponding entry is covered with the layer. After the user operation performed on the layer is obtained, the target region may be determined based on the user operation, for example, a touchscreen sliding operation is performed, to remove the layer from the target region, so as to display a part or all of the second target data (namely, the translation data), as shown in (b) in FIG. 7. A layer for a second piece of second target data is totally removed, so that all content of the second target data is displayed. It should be noted that, a layer identifier corresponding to the second target data may also be correspondingly adjusted. For example, if the identifier is "eye-open", it indicates that all of the data can be displayed after the identifier is tapped, or if the identifier is "eye-closed", it indicates that all of the data can be hidden after the identifier is tapped. As shown in (b) in FIG. 7, all of the second target data is already displayed, and the layer identifier is also correspondingly displayed as "eye-closed", to help restore to a display mode with the covering layer.

It should be noted that, the predetermined content may include, but is not limited to, a commercial advertisement for promotion, a public service advertisement, or the like, for example, as shown in FIG. 7. In addition, the predetermined content may also be prompt information related to the currently covered second target data, or the like. The foregoing description is merely an example, and this is not limited in one embodiment.

According to one embodiment provided in this application, the matching layer is generated for the second target data, so that the generated layer completely covers the corresponding second target data, without occupying additional display space, thereby improving utilization of display space of the display interface. In addition, layers of different styles are generated, or other predetermined content is displayed by reusing the layer. This enriches displayed content and improves a display effect, to attract more attention.

In an optional solution, the first display unit 1404 includes:

(1) a first display module, configured to display the entry satisfying a predetermined condition in the display interface, where the predetermined condition is carried in the data display request.

Optionally, in one embodiment, the first display module includes at least one of the following:

(1) a first display submodule, configured to display, in the display interface, the entry stored at a predetermined storage time;

(2) a second display submodule, configured to display, in the display interface, the entry marked by using a predetermined identifier; or (3) a third display submodule, configured to display, in the display interface, the entry whose operation frequency is greater than a predetermined threshold.

In a specific application scenario, an example in which the apparatus is applied to an application client for language translation is used. To conveniently filter entries, generally, a predetermined condition needs to be set for an entry. Generally, some predetermined conditions may be set in the data display request. For example, the entry stored at the predetermined time or an entry stored within a predetermined period of time may be displayed in the display interface. The predetermined period of time may be specifically a time limit of one day, one week, or one month. In addition, the entry marked by the user by using the predetermined identifier may also be displayed. Specifically, in the application client for language translation, the entry may be an unfamiliar word or sentence or the like, or may be an entry marked by the user and to be particularly memorized, or the like. On the other hand, the predetermined condition may be that the entry whose operation frequency is greater than the predetermined threshold is displayed in the display interface. Specifically, in the application client for language translation, an entry in entries that are collected by the user and whose operation frequency is greater than a particular threshold may be displayed. Specifically, this may be set based on practical experience.

According to one embodiment provided in this application, the entry satisfying the predetermined condition is displayed in the display interface, to rapidly select and display an entry meeting a user requirement, so as to simplify a searching operation, thereby reducing a searching time, achieving a rapid display effect, and improving use experience of the user.

In an optional solution, the determining unit 1406 includes:

(1) a first obtaining module, configured to obtain an operation mode of the user operation performed on the mask layer; and (2) a first determining module, configured to determine, based on the operation mode, the target region matching the user operation.

Optionally, the first determining module includes a combination of the following several modules:

In an optional implementation, the first determining module includes:

(1) a first obtaining submodule, configured to obtain, if the operation mode indicates that the operation performed on the mask layer is a touchscreen sliding operation, a first track that is generated after a touchscreen action is performed on the mask layer through the touchscreen sliding operation; and (2) a first determining submodule, configured to determine, based on the first track, the target region matching the touchscreen sliding operation.

Optionally, in one embodiment, a track width of the first track may be a preset width, or may be a width matching touchscreen pressure applied by the touchscreen action. Higher touchscreen pressure indicates a wider track. The foregoing description is merely an example, and this is not limited in one embodiment.

Specifically, descriptions are provided with reference to (a) and (b) in FIG. 6, and each piece of second target data shown in (a) in FIG. 6 is hidden. Assuming that the obtained operation type of the user operation performed on the mask layer indicates the touchscreen sliding operation, and a sliding track of the touchscreen sliding operation on the mask layer is shown in (b) in FIG. 6. The touchscreen sliding operation is performed on a layer on translation data of a first entry "Xingfu" in the display screen, where touchscreen pressure applied by the touchscreen action is higher, and a corresponding track is also wider; and the touchscreen sliding operation is also performed on a layer on translation data of a second entry "happy", where touchscreen pressure applied by the touchscreen action is lower, and a corresponding track is also narrower. The target region matching the touchscreen sliding operation is determined based on the track corresponding to the touchscreen action.

It should be noted that, the touchscreen sliding operation may be, but is not limited to, a tap operation or an operation of continuous sliding. The corresponding first track may be, but is not limited to the following: (1) When the touchscreen sliding operation is continuous sliding, the first track is obtained based on a moving track formed during the sliding, to use the first track as the target region. (2) When the touchscreen sliding operation is a tap operation, the first track is obtained based on an operation position of the tap operation, to use the first track as the target region. For example, when the touchscreen sliding operation is tapping, a circular moving track, namely, a circular region or an elliptical region with a tap position as a circle center may be displayed. This is not limited herein in one embodiment.

It should be noted that, in one embodiment, the touchscreen sliding operation may also be referred to as a smearing operation and the corresponding moving track may be obtained based on a smearing track that is generated after the smearing operation is performed on the layer, but this is not limited thereto. The foregoing description is merely an example, and this is not limited in one embodiment.

According to one embodiment provided in this application, if the operation mode indicates that the operation performed on the mask layer is the touchscreen sliding operation, the first track that is generated after the touchscreen action is performed on the mask layer through the touchscreen sliding operation is obtained, and the target region matching the touchscreen sliding operation is determined based on the first track, to determine the target region based on the first track generated by the touchscreen action, so as to display the second target data in the target region. The touchscreen sliding operation (namely, the smearing operation) is performed to flexibly control the generated track (namely, the smearing track), so as to flexibly control the second target data displayed in the target region covered by the track (namely, the smearing track), thereby improving a memorization effect.

In another optional implementation, the first determining module includes:

(1) a second obtaining submodule, configured to obtain, if the operation mode indicates that the operation performed on the mask layer is an air pressure sensing operation, a second track that is generated after a blowing action is performed on the mask layer through the air pressure sensing operation; and (2) a second determining submodule, configured to determine, based on the second track, the target region matching the air pressure sensing operation.

Optionally, in one embodiment, if a first sensing region that is generated after the blowing action is performed on the mask layer is obtained, the second track is determined based on a position of the first sensing region. An area of the first sensing region matches air flow pressure indicated by the air pressure sensing operation.

Specifically, descriptions are provided with reference to (a) to (c) in FIG. 8, and each piece of second target data shown in (a) in FIG. 8 is hidden. Assuming that the obtained operation mode of the user operation performed on the mask layer indicates the air pressure sensing operation, and the air pressure sensing operation is performed only once, a first sensing region (a transparent circle shown in the figure) shown in (b) in FIG. 8 is generated on the layer. Higher air flow pressure indicated by the air pressure sensing operation indicates a larger area of the first sensing region (to be specific, a larger radius of the sensing region). The first track is determined based on a position of the first sensing region. For example, after the first sensing region is driven to move from a position shown in (b) in FIG. 8 (for example, the first sensing region is slid) to a position shown in (c) in FIG. 8, during the movement of the first sensing region, an area of the target region covered by the first track is always the same as the area of the first sensing region, and the position of the first sensing region is always determined as the target region.

Optionally, in one embodiment, if a first sensing region that is generated after the blowing action is performed on the layer is obtained, the second track is determined based on a moving track of the first sensing region. An area of the first sensing region matches air flow pressure indicated by the air pressure sensing operation.

Specifically, descriptions are provided with reference to (a) to (c) in FIG. 9, and each piece of second target data shown in (a) in FIG. 9 is hidden. Assuming that the obtained operation mode of the user operation performed on the mask layer indicates the air pressure sensing operation, and the air pressure sensing operation is performed only once, a first sensing region (a transparent circle shown in the figure) shown in (b) in FIG. 9 is generated on the mask layer. Higher air flow pressure indicated by the air pressure sensing operation indicates a larger area of the first sensing region. The target region is determined based on a moving track of the first sensing region. For example, after the first sensing region is driven to move from a position shown in (b) in FIG. 9 (for example, the first sensing region is slid) to a position shown in (c) in FIG. 9, a second track may be obtained based on a region covered by the moving track of the first sensing region on the layer, and the target region matching the air pressure sensing operation is determined based on the second track corresponding to the first sensing region, to display the second target data matching the target region.

Optionally, in one embodiment, if at least two first sensing regions that are generated after the blowing action is performed on the layer are obtained, the second track is determined based on positions of the at least two first sensing regions. An area of the first sensing region matches air flow pressure indicated by the air pressure sensing operation.

Specifically, descriptions are provided with reference to (a) and (b) in FIG. 10, and each piece of second target data shown in (a) in FIG. 10 is hidden. Assuming that the obtained operation mode of the user operation performed on the layer indicates the air pressure sensing operation, and the air pressure sensing operation is performed a plurality of times, a plurality of first sensing regions (transparent circles shown in the figure) shown in (b) in FIG. 10 is generated on the layer. Higher air flow pressure indicated by the air pressure sensing operation indicates a larger area of the first sensing region. A second track shown in (b) in FIG. 10 is obtained based on positions of the plurality of first sensing regions, and the target region matching the air pressure sensing operation is determined based on the second track, to display the second target data matching the target region.

According to one embodiment provided in this application, if the operation mode indicates that the operation performed on the mask layer is the air pressure sensing operation, the second track that is generated after the blowing action is performed on the mask layer through the air pressure sensing operation is obtained; and the second track is determined based on the moving track of the first sensing region, to determine, based on the second track, the target region matching the air pressure sensing operation; or after the at least two first sensing regions that are generated after the blowing action is performed on the mask layer are obtained, the second track is determined based on the positions of the at least two first sensing regions; and the air pressure sensing operation is performed on the mask layer, to generate the first sensing region matching the air flow pressure indicated by the air pressure sensing operation, so as to determine, based on the position and/or the moving track of the first sensing region, the target region matching the air pressure sensing operation. The target region matching the air pressure sensing operation is determined based on the second track, to remove the mask layer from the target region, so as to display the second target data in the target region. The air pressure sensing operation is performed, to flexibly control the generated moving track, so as to flexibly control the second target data displayed in the target region covered by the moving track, thereby improving a memorization effect.

In still another optional implementation, the first determining module includes:

(1) a third obtaining submodule, configured to obtain, if the operation mode indicates that the operation performed on the mask layer is a vibration sensing operation, a third track that is generated after a vibration action is performed based on a reference point on the mask layer through the vibration sensing operation;

(2) a third determining submodule, configured to determine, based on the third track, the target region matching the vibration sensing operation.

It should be noted that, after the obtained operation mode indicates that the operation performed on the mask layer is the vibration sensing operation, the reference point on the mask layer for the vibration sensing operation is first determined, and may be any vertex of a layer matching a first piece of second target data in the current display interface, or a position of the reference point may be voluntarily set by the user; then, the third track that is generated after the vibration action is performed based on the reference point on the layer through the vibration sensing operation is obtained. If the terminal is a mobile phone, the vibration action may be performed through "Shake". A higher vibration frequency and/or higher vibration strength of the vibration sensing operation indicates a larger area of the third track generated based on the reference point. Then, the target region matching the vibration sensing operation is determined based on the third track, to display the second target data in the target region. For example, after the current second target data is completely displayed, a position of a reference point corresponding to a next piece of second target data is moved to, or a position of a next reference point selected by the user is obtained.

Optionally, in one embodiment, the reference point may be, but is not limited to, any point on the layer. A vibration frequency and/or vibration strength of the terminal is obtained through a built-in speed and force sensor in the terminal, to generate the third track through movement relative to the reference point. For example, with the reference point as a circle center, a radius relative to the reference point is determined based on the vibration frequency and/or the vibration strength, to generate the corresponding third track based on the reference point.

According to one embodiment provided in this application, if the operation mode indicates that the operation performed on the layer is the vibration sensing operation, the third track that is generated after the vibration action is performed based on the reference point on the layer through the vibration sensing operation is obtained; and the target region matching the vibration sensing operation is determined based on the third track, to remove the layer from the target region covered by the third track, so as to display the second target data in the target region. The vibration sensing operation is performed, to flexibly control the generated moving track, so as to flexibly control the second target data displayed in the target region covered by the moving track, thereby improving a memorization effect.

In an optional solution, the data display apparatus further includes at least one of the following:

(1) a third display unit, configured to: before the requested entry is displayed in the display interface in response to the data display request, display prompt information on the display interface, where the prompt information is used to prompt whether to perform the user operation; and display the entry in the display interface if it is determined to perform the user operation; or (2) a second obtaining unit, configured to: obtain an operation instruction that is generated by performing a tap operation on an operation button displayed in the display interface; and display the entry in the display interface in response to the operation instruction, where the operation button is used to instruct to perform the user operation.

It should be noted that, in one embodiment, the entry may be, but is not limited to, a target entry collected by a first account of the user to the client in advance, or may be a locally stored target entry in the client by the user. Before the collection interface is entered to display the entry, the foregoing steps may be performed, but this is not limited thereto, to determine whether to display an entry with second target data covered with a layer in the collection interface.

Specifically, descriptions are provided with reference to (a) and (b) in FIG. 11. Assuming that after the data display request is obtained, and before the collection interface is entered to display the entry, prompt information shown in (a) in FIG. 11 is displayed through a pop-up window, to prompt the user "whether to perform the user operation" (a "smearing" operation is used as an example), and if it is determined to perform the user operation, the entry with the second target data covered with the layer is displayed, as shown in (b) in FIG. 11.

In addition, in one embodiment, the operation button used to perform the user operation may be provided in the display interface, but this is not limited thereto. For example, after the collection interface is entered, after a "smearing button" is tapped, the entry with the covering layer is displayed in the collection interface.

According to one embodiment provided in this application, the interface having the entry with the second target data covered with the layer is entered in different manners, to improve display diversity and enrich a display manner.

In an optional solution, the data display apparatus further includes:

(1) a first update unit, configured to: if a plurality of entries is requested, before the requested entry is displayed in the display interface in response to the data display request, update sorting identifiers of the plurality of entries, where the sorting identifiers are determined based on storage time of the entries and/or operation frequency at which the user operation is performed on the entries; and (2) a second update unit, configured to update an arrangement order of the plurality of entries based on the sorting identifiers.

Optionally, in one embodiment, the first update unit includes at least one of the following:

(1) a first update module, configured to update, when a newly added entry is detected, the sorting identifiers respectively corresponding to the plurality of entries; or (2) a second update module, configured to update, after the user operation is performed on at least one of the plurality of entries, the sorting identifiers corresponding to the plurality of entries.

It should be noted that, in a specific application scenario, an entry may also exist in a form of a list. Therefore, for ease of description below, in one embodiment, an entry list is used to describe entry arrangement.

Specifically, descriptions are provided with reference to FIG. 12. Assuming that an entry list shown in (a) in FIG. 12 is obtained based on storage timestamps, after the touchscreen sliding operation (namely, the smearing operation) is frequently performed on an entry "Kaixin" for memorization, a sorting identifier of the entry "Kaixin" is updated, and the entry list is also updated, to obtain an entry list shown in (b) in FIG. 12

Optionally, in one embodiment, the sorting identifier may be, but is not limited to, a sorting score (sort_score) matching each entry. The sorting score may be dynamically calculated based on the storage time (collect_date) of the entry and the operation frequency (action_count) at which the user operation (for example, the smearing operation) is performed on the entry, but this is not limited thereto, to ensure that a newly added entry and an entry operated at high frequency can be displayed in priority. In one embodiment, the storage time may be, but is not limited to, a time at which the entry is collected to the entry list. The foregoing description is merely an example, and this is not limited in one embodiment.

In an optional embodiment, the sorting score (sort_score) may be calculated based on the following formula, but this is not limited thereto:

days_ago=(now−collect_date)·days( );

action_score=1+ln(1+action_count);

score_factor=1+(2/(1+days_ago)/7)); and sort_score=score_factor*action_score.

It should be noted that, in one embodiment, there is a linear relationship between the sorting score sort_score and the storage time, and a shorter storage time indicates a higher sorting score, to control a newly collected entry to be displayed in priority based on the linear relationship. There is a nonlinear relationship between the sorting score sort_score and the operation frequency, and higher operation frequency indicates a higher sorting score, to display an entry operated at high frequency in priority in the entry list without increasing calculation load if a value of the operation frequency is controlled based on the nonlinear relationship.

According to one embodiment provided in this application, the arrangement order of the entry list is updated in real time, to ensure that a newly added entry and an entry operated at high frequency in the entry list can be displayed in priority in the entry list, thereby improving a display effect, and more facilitating memorization by the user.

In an optional solution, the data display apparatus further includes:

(1) a third obtaining unit, configured to: before the data display request is obtained, obtain an entry collection request, where the entry collection request carries a hash value matching a target entry to be collected, and the hash value is determined based on the first target data in the target entry, a data type of the first target data, and a data type of the second target data;

(2) a searching unit, configured to search for the target entry based on the hash value; and (3) a collection unit, configured to collect the target entry when the target entry is not found.

Optionally, in one embodiment, the hash value matching the target entry may be determined based on the first target data in the target entry, the data type of the first target data, and the data type of the second target data, but this is not limited thereto. For example, a hash value (hashcode) uniquely corresponding to the target entry is generated based on the first target data (such as original data "tree"), the data type (such as a source language type (for example, EN)) of the first target data, and the data type (such as a target language type (for example, (CN)) of the second target data by using a hash algorithm.

Optionally, in one embodiment, in an entry displayed on a home screen, a target entry that interests the user may be tapped, to implement a collection and storage operation on the target entry, but this is not limited thereto. As shown in FIG. 13, an entry "happy" that interests the user may be tapped, and then, an operation tool bar corresponding to the entry "happy" is displayed on the home screen. As shown in FIG. 13, after a "collection button" is tapped, a collection operation may be performed on the entry "happy". In addition, if the current entry is already collected, a collection cancelation operation may be performed through the tap operation.

In a process of collecting the target entry, a hash value hashcode corresponding to the entry "happy" is obtained, and all prestored entries are searched for the entry "happy". For example, searching is performed by using a marker bit is_collect. If the marker bit is_collect of the corresponding entry is not found, the collection operation is performed, and the marker bit is_collect is correspondingly changed, for example, the marker bit is_collect is changed to and marked as "1"; or if the marker bit is_collect of the corresponding entry is found, the collection cancelation operation is performed, and the marker bit is_collect is correspondingly changed, for example, the marker bit is_collect is changed to and marked as "0".

According to one embodiment provided in this application, a unique hash value is configured for the entry, to avoid repeated storage of the same entry, thereby saving storage space and implementing deduplication.

Figure 15:
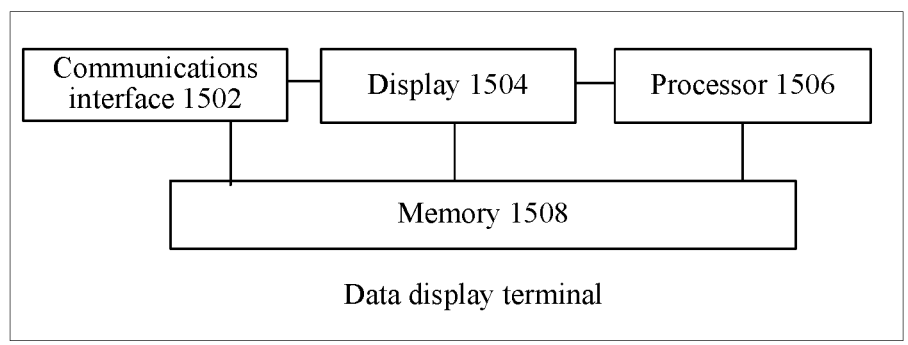
FIG. 15 is a schematic diagram of an optional data display terminal according to an embodiment of this application.

According to still another aspect of the embodiments of this application, a data display terminal configured to implement the foregoing data display method is further provided. As shown in FIG. 15, the terminal includes:

(1) a communications interface 1502, configured to obtain a data display request;

(2) a display 1504, connected to the communications interface 1502, and configured to display a requested entry in a display interface in response to the data display request, the entry including first target data and second target data, there being a predetermined association relationship between the first target data and the second target data, and the second target data being hidden by a mask layer in the display interface;

(3) a processor 1506, connected to the display 1504, and configured to determine a target region based on a user operation performed on the mask layer, the mask layer having a size matching a space on the display interface designated for the second target data and covering the second target data; and (4) a memory 1508, connected to the communications interface 1502, the display 1504, and the processor 1506, and configured to display the second target data in the target region.

Optionally, for a specific example in one embodiment, refer to the examples described in the foregoing embodiments, and details are not described herein again in one embodiment.

According to still another aspect of the embodiments of this application, a storage medium is further provided. Optionally, in one embodiment, the storage medium may be located in at least one of a plurality of network devices in a network.

Optionally, in one embodiment, the storage medium is configured to store a computer program configured to perform the following steps:

S1: Obtain a data display request.

S2: Obtain an entry in response to the data display request, the entry comprising first target data and second target data, and the first target data and the second target data having a predetermined association relationship; display the first target data in a display interface; designate a space on the display interface for the second target data; and generate a mask layer, the mask layer having a size matching the designated space and covering the second target data.

S3: Determine a target region based on a user operation performed on the designated space.

S4: Display the second target data in the target region.

Optionally, in one embodiment, the storage medium is configured to store a computer program configured to perform the following steps:

S1: Generate the mask layer matching the second target data.

S2: Cover the second target data in the entry with the mask layer, so that the second target data is hidden when the entry is displayed in the display interface.

Optionally, in one embodiment, the storage medium is configured to store a computer program configured to perform the following steps:

S1: Perform Gaussian blur processing on the mask layer based on a predetermined parameter.

S2: Perform Mosaic processing on the mask layer.

S3: Configure the mask layer as an image displayed with predetermined content.

Optionally, in one embodiment, the storage medium is configured to store a computer program configured to perform the following step:

S1: Display the entry satisfying a predetermined condition in the display interface, where the predetermined condition is carried in the data display request.

Optionally, in one embodiment, the storage medium is configured to store a computer program configured to perform the following steps:

S1: Display, in the display interface, the entry stored at a predetermined storage time.

S2: Display, in the display interface, the entry marked by using a predetermined identifier.

S3: Display, in the display interface, the entry whose operation frequency is greater than a predetermined threshold.

Optionally, in one embodiment, the storage medium is configured to store a computer program configured to perform the following steps:

S1: Obtain an operation mode of the user operation performed on the mask layer.

S2: Determine, based on the operation mode, the target region matching the user operation.

Optionally, in one embodiment, the storage medium is configured to store a computer program configured to perform the following steps:

S1: Obtain, if the operation mode indicates that the operation performed on the mask layer is a touchscreen sliding operation, a first track that is generated after a touchscreen action is performed on the mask layer through the touchscreen sliding operation.

S2: Determine, based on the first track, the target region matching the touchscreen sliding operation.

Optionally, in one embodiment, the storage medium is configured to store a computer program configured to perform the following steps:

S1: Obtain, if the operation mode indicates that the operation performed on the mask layer is an air pressure sensing operation, a second track that is generated after a blowing action is performed on the mask layer through the air pressure sensing operation.

S2: Determine, based on the second track, the target region matching the air pressure sensing operation.

Optionally, in one embodiment, the storage medium is configured to store a computer program configured to perform the following steps:

S1: Determine, if a first sensing region that is generated after the blowing action is performed on the mask layer is obtained, the second track based on a position of the first sensing region.

S2: Determine, if a first sensing region that is generated after the blowing action is performed on the mask layer is obtained, the second track based on a moving track of the first sensing region.

S3: Determine, if at least two first sensing regions that are generated after the blowing action is performed on the mask layer are obtained, the second track based on positions of the at least two first sensing regions.

Optionally, in one embodiment, the storage medium is configured to store a computer program configured to perform the following steps:

S1: Obtain, if the operation mode indicates that the operation performed on the mask layer is a vibration sensing operation, a third track that is generated after a vibration action is performed based on a reference point on the mask layer through the vibration sensing operation.

S2: Determine, based on the third track, the target region matching the vibration sensing operation.

Optionally, in one embodiment, the storage medium is configured to store a computer program configured to perform the following steps:

S1: Display prompt information on the display interface, where the prompt information is used to prompt whether to perform the user operation; and display the entry in the display interface if it is determined to perform the user operation.

S2: Obtain an operation instruction that is generated by performing a tap operation on an operation button displayed in the display interface; and display the entry in the display interface in response to the operation instruction, where the operation button is used to instruct to perform the user operation.

Optionally, in one embodiment, the storage medium is configured to store a computer program configured to perform the following steps:

S1: Update sorting identifiers of the plurality of entries, where the sorting identifiers are determined based on storage time of the entries and/or operation frequency at which the user operation is performed on the entries.

S2: Update an arrangement order of the plurality of entries based on the sorting identifiers.

Optionally, in one embodiment, the storage medium is configured to store a computer program configured to perform the following steps:

S1: Obtain an entry collection request, where the entry collection request carries a hash value matching a target entry to be collected, and the hash value is determined based on the first target data in the target entry, a data type of the first target data, and a data type of the second target data.

S2: Search for the target entry based on the hash value.

S3: Collect the target entry when the target entry is not found.

Optionally, in one embodiment, the storage medium may include, but is not limited to, any medium that can store a computer program, such as a USB flash drive, a ROM, a RAM, a removable hard disk, a magnetic disk, or an optical disc.

Optionally, for a specific example in one embodiment, refer to the examples described in the foregoing embodiments, and details are not described herein again in one embodiment.

The sequence numbers of the foregoing embodiments of this application are merely for description, and do not imply the preference among the embodiments.

When the integrated unit in the embodiments is implemented in the form of a software functional unit and sold or used as an independent product, the integrated unit may be stored in the computer-readable storage medium.

In the foregoing embodiments of this application, the description of each embodiment has respective focuses. For a part that is not described in detail in an embodiment, refer to related descriptions in other embodiments.

In the several embodiments provided in this application, it should be understood that the disclosed client may be implemented in other manners. The described apparatus embodiment is merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The foregoing descriptions are merely optional implementations of this application. It should be noted that a person of ordinary skill in the art may make several improvements or refinements without departing from the principle of this application and the improvements or refinements shall fall within the protection scope of this application.

INDUSTRIAL APPLICABILITY

In the embodiments of this application, a requested entry is displayed in a display interface in response to a data display request, the entry including first target data and second target data, there being a predetermined association relationship between the first target data and the second target data, and the second target data being hidden by a mask layer in the display interface; and then a user operation is performed on the mask layer matching the second target data, and a target region is determined based on the user operation, to display the second target data in the target region, thereby changing a display status of the second target data by performing the user operation on the layer matching the second target data, resolving a problem in a related technology that displayed content cannot be flexibly adjusted, and flexibly controlling the second target data to be displayed.

What is claimed is:

1. A data display method implemented by a computing device, comprising:
    obtaining an entry collection request that carries a hash value matching an entry to be collected, the entry comprising first target data and second target data, the first target data and the second target data having a predetermined association relationship, and the hash value being determined based on the first target data, a data type of a first target data, and a data type of a second target data;
    searching for the entry based on the hash value;
    collecting the entry when the entry is not found;
    obtaining a data display request;
    in response to the data display request, displaying the first target data in a display interface;
    designating a space on the display interface for the second target data;
    generating a mask layer, the mask layer having a size matching the designated space and covering the second target data;
    determining, a target region based on a user operation performed on the designated space; and
    displaying the second target data in the target region.

2. The method according to claim 1, wherein the method further comprises:
    covering the second target data in the entry with the mask layer, so that the second target data is hidden when the entry is displayed in the display interface.

3. The method according to claim 1, wherein the generating the mask layer comprises at least one of the following:
    performing Gaussian blur processing on the mask layer based on a predetermined parameter;
    performing Mosaic processing on the mask layer; or
    configuring the mask layer as an image displayed with predetermined content.

4. The method according to claim 1, wherein the obtaining a requested entry in response to the data display request comprises:
    obtaining the entry satisfying a predetermined condition, wherein the predetermined condition is carried in the data display request.

5. The method according to claim 4, wherein the obtaining the entry satisfying a predetermined condition comprises at least one of the following:
    obtaining the entry stored at a predetermined storage time;
    obtaining the entry marked by using a predetermined identifier; or obtaining the entry whose operation frequency is greater than a predetermined threshold.

6. The method according to claim 1, wherein the determining a target region based on a user operation performed on the designated space comprises:
   obtaining an operation mode of the user operation performed on the designated space;
   determining, based on the operation mode, the target region matching the user operation.

7. The method according to claim 6, wherein the determining, based on the operation mode, the target region matching the user operation comprises:
   obtaining, if the operation mode indicates that the user operation performed on the mask layer is a touchscreen sliding operation, a first track generated according to the touchscreen sliding operation performed on the mask layer; and
   determining, based on the first track, the target region matching the touchscreen sliding operation.

8. The method according to claim 6, wherein the determining, based on the operation mode, the target region matching the user operation comprises:
   obtaining, if the operation mode indicates that the user operation directed to the mask layer is an air pressure sensing operation, a second track generated according to the air pressure sensing operation; and
   determining, based on the second track, the target region matching the air pressure sensing operation.

9. The method according to claim 8, wherein the obtaining a second track according to the air pressure sensing operation comprises:
   determining, if a first sensing region generated according to the air pressure sensing operation is obtained, the second track based on a position of the first sensing region; or
   determining, if a first sensing region generated according to the air pressure sensing operation is obtained, the second track based on a moving track of the first sensing region; or
   determining, if at least two first sensing regions generated according to the air pressure sensing operation are obtained, the second track based on positions of the at least two first sensing regions, wherein
   an area of the first sensing region matches air flow pressure indicated by the air pressure sensing operation.

10. The method according to claim 6, wherein the determining, based on the operation mode, the target region matching the user operation comprises:
    obtaining, if the operation mode indicates that the user operation directed to the mask layer is a vibration sensing operation, a third track based on a reference point on the mask layer according to the vibration sensing operation; and
    determining, based on the third track, the target region matching the vibration sensing operation.

11. The method according to claim 1, wherein before the obtaining an entry in response to the data display request, the method further comprises at least one of the following:
    displaying prompt information on the display interface, wherein the prompt information is used to prompt whether to perform the user operation; and obtaining the entry if it is determined to perform the user operation; or
    obtaining an operation instruction that is generated by performing a tap operation on an operation button displayed in the display interface; and obtaining the entry in response to the operation instruction, wherein the operation button is used to instruct to perform the user operation.

12. The method according to claim 1, wherein if a plurality of entries is requested, before the obtaining an entry in response to the data display request, the method further comprises:
    updating sorting identifiers of the plurality of entries, wherein the sorting identifiers are determined based on at least one of storage time of the entries or operation frequency at which user operations have been performed on the entries; and
    updating an arrangement order of the plurality of entries based on the sorting identifiers.

13. A data display apparatus, comprising:
    a memory; and
    a processor coupled to the memory and configured to:
    obtain an entry collection request that carries a hash value matching an entry to be collected, the entry comprising first target data and second target data, the first target data and the second target data having a predetermined association relationship, and the hash value being determined based on the first target data, a data type of a first target data, and a data type of a second target data;
    search for the entry based on the hash value;
    collect the entry when the entry is not found;
    obtain a data display request;
    in response to the data display request, display the first target data in a display interface;
    designate a space on the display interface for the second target data;
    generate a mask layer, the mask layer having a size matching the designated space and covering the second target data;
    determine a target region based on a user operation performed on the designated space; and
    display the second target data in the target region.

14. The apparatus according to claim 13, wherein the processor is further configured to:
    cover the second target data in the entry with the mask layer, so that the second target data is hidden when the entry is displayed in the display interface.

15. The apparatus according to claim 13, wherein the processor is further configured to perform at least one of the following:
    Gaussian blur processing on the mask layer based on a predetermined parameter;
    Mosaic processing on the mask layer; or
    configuring the mask layer as an image displayed with predetermined content.

16. The apparatus according to claim 13, wherein the processor is further configured to:
    obtain the entry satisfying a predetermined condition, wherein the predetermined condition is carried in the data display request.

17. The apparatus according to claim 16, wherein the processor is further configured to perform at least one of the following:
    obtaining the entry stored at a predetermined storage time;
    obtaining the entry marked by using a predetermined identifier; or
    obtaining the entry whose operation frequency is greater than a predetermined threshold.

18. The apparatus according to claim 13, wherein the processor is further configured to:

obtain an operation mode of the user operation performed on the mask layer; and determine, based on the operation mode, the target region matching the user operation.

19. A non-transitory computer-readable storage medium storing computer program instructions executable by at least one processor to perform:

obtaining an entry collection request that carries a hash value matching an entry to be collected, the entry comprising first target data and second target data, the first target data and the second target data having a predetermined association relationship, and the hash value being determined based on the first target data, a data type of a first target data, and a data type of a second target data;

searching for the entry based on the hash value;

collecting the entry when the entry is not found;

obtaining a data display request;

in response to the data display request, displaying the first target data in a display interface;

designating a space on the display interface for the second target data;

generating a mask layer, the mask layer having a size matching the designated space and covering the second target data;

determining a target region based on a user operation performed on the designated space; and displaying the second target data in the target region.

\* \* \* \* \*